(12) United States Patent
Rasmussen et al.

(10) Patent No.: US 7,249,291 B2
(45) Date of Patent: Jul. 24, 2007

(54) SYSTEM AND METHOD FOR RELIABLY COMMUNICATING THE CONTENT OF A LIVE DATA STREAM

(75) Inventors: Jens Rasmussen, Copenhagen (DK); Amin Shokrollahi, San Jose, CA (US); Soren Lassen, San Francisco, CA (US); Gavin Horn, San Diego, CA (US); Vivek Goyal, Berkeley, CA (US); Barry Dobyns, Los Gatos, CA (US); Michael Luby, Berkeley, CA (US)

(73) Assignee: Digital Fountain, Inc., Fremont, CA (US)

( * ) Notice: Subject to any disclaimer, the term of this patent is extended or adjusted under 35 U.S.C. 154(b) by 517 days.

(21) Appl. No.: 10/367,573

(22) Filed: Feb. 14, 2003

(65) Prior Publication Data

US 2003/0226089 A1    Dec. 4, 2003

Related U.S. Application Data

(60) Provisional application No. 60/357,443, filed on Feb. 15, 2002.

(51) Int. Cl.
*H03M 13/05* (2006.01)
(52) U.S. Cl. .................................... 714/701
(58) Field of Classification Search ............... 714/701, 714/784
See application file for complete search history.

(56) References Cited

U.S. PATENT DOCUMENTS 5,568,614 A    10/1996    Mendelson et al.

(Continued)

FOREIGN PATENT DOCUMENTS

WO    WO 96/34463 A1    10/1996

OTHER PUBLICATIONS

P.A. Chou, A. Mohr, A. Wang, S. Mehrotra, "FEC and Pseudo-ARQ for Receiver-Driven Layered Multicast of Audio and Video," pp. 440-449, IEEE Computer Society, Data Compression Conference (2000).

*Primary Examiner*—Stephen M. Baker
(74) *Attorney, Agent, or Firm*—Townsend and Townsend and Crew LLP

(57) ABSTRACT

A method for communicating the content of a live data stream to a receiver using a plurality of channels comprising two encoder channels used to encode the live data content prior to transmission. Initially a plurality of segments of a live data stream are received, wherein each segment contains segment data. A forward error correction algorithm is applied to each segment's data, thereby producing FEC-encoded segment data. The FEC-encoded segment data is contained within an FEC-encoded block, resulting in a corresponding plurality of FEC-encoded blocks being generated. Each FEC-encoded block is copied to a sub-channel on both a first encoder channel and a second encoder channel, resulting in a plurality of FEC-encoder blocks residing on the first and second encoder channels. The first and second encoder channels differ in the number of sub-channels they contain (interleaving depth), and accordingly the arrangement of the FEC-encoded blocks in the first and second encoder channels are different. A first cross-section of the FEC-encoded segment data contained within the FEC-encoded blocks resident in the first encoder channel is added to a first transmit block $T_0$. Similarly, A first cross-section of the FEC-encoded segment data contained within the FEC-encoded blocks resident in the second encoder channel is added to a second transmit block $T_1$. The first and second transmit blocks are then communicated to the receiver.

13 Claims, 17 Drawing Sheets

U.S. PATENT DOCUMENTS

| | | |
|---|---|---|
| 6,014,706 A | 1/2000 | Cannon et al. |
| 6,272,658 B1 | 8/2000 | Steele et al. |
| 6,154,452 A * | 11/2000 | Marko et al. ............... 370/321 |
| 6,229,824 B1 * | 5/2001 | Marko ........................ 370/477 |
| 6,298,462 B1 * | 10/2001 | Yi .............................. 714/784 |
| 6,314,289 B1 * | 11/2001 | Eberlein et al. ............. 455/427 |
| 6,523,147 B1 * | 2/2003 | Kroeger et al. .............. 714/792 |
| 6,535,920 B1 | 3/2003 | Parry et al. |
| 6,704,370 B1 * | 3/2004 | Chheda et al. ............... 375/299 |
| 7,110,412 B2 * | 9/2006 | Costa et al. ........... 370/395.61 |

\* cited by examiner

SYSTEM AND METHOD FOR RELIABLY COMMUNICATING THE CONTENT OF A LIVE DATA STREAM

CROSS REFERENCE TO RELATED APPLICATIONS

This application claims the benefit of priority from U.S. Provisional Application Ser. No. 60/357,443 entitled "System and Method for Live Data Transmission" filed Feb. 15, 2002, the contents of which are herein incorporated by reference in its entirety for all purposes.

FIELD OF THE INVENTION

This invention relates to systems and methods for communicating data, and more specifically to systems and methods for reliably communicating live streaming data.

BACKGROUND OF THE INVENTION

"Streaming" is a broad term for the delivery of time-ordered data such that the beginning will be consumed (e.g., fed into another system for display) before the end is completely delivered. The distinguishing characteristic of streaming is that the data contains desired consumption times relative to the consumption of the beginning of the stream. For example, a desired consumption time for video streaming may be of the following form: the millionth byte is used to generate the three-hundredth frame of a 30 frame per second video stream and thus should be received within 10 seconds of the consumption of the first byte.

Live streaming is streaming that is characterized by a relatively short delay between the instant at which data enters the transmitting unit and the instant at which the transmitted data is affected by this data. The content of a live stream may include audio, video, stock ticker data, database updates, telemetry, delta or change propagation data and many other types of data.

The term "live streaming" can apply to data that is not "live" in the common-language sense of being generated contemporaneously with the data communication. For example, it is clear that a system that sends digitized video of a sporting event to a receiver that displays the video with short delay is a live streaming system. But one may also apply live streaming techniques to a recorded movie; from the point of view of the streaming transmitter, the information from the movie playout device is a live stream.

A reliable live streaming system accurately reproduces at a one or more receiver the content of a live data stream that is present at a transmitter, most of the time, despite the loss of some of the transmitted data. The most common methods for reliable communication of non-streaming data on computer networks include the use of the TCP and IP protocols. The use of TCP/IP has significant disadvantages for live streaming, especially if a single transmitter is communicating with a large number of receivers. With TCP/IP, the sender is virtually connected to each receiver with an independent, variable-rate, reliable, byte-granularity channel. The variable-rate property is problematic for satisfying the delivery deadlines of live streaming, and the fact that each connection is independent means that some resources of the transmitter are consumed in linear proportion to the number of receivers. For these reasons, it is often preferable for the reliability mechanisms to be based on forward error correction (FEC) codes rather than retransmission of lost data.

A live streaming system has several important performance measures, including the loss protection, protection period, and startup time. Loss protection is defined as the fraction of the live stream data that can be lost over a specified period of time without interrupting the timely reconstruction of the live data stream at the receiver. The protection period is defined as the period of time over which the loss fraction is measured (the loss fraction may be higher for shorter periods of time). The startup time is generally defined as the time from the beginning of reception of data until the uninterrupted reconstruction of the live data stream can begin.

Unfortunately, current systems which employ FEC for live streaming are severely limited in the combinations of these performance measures that can be achieved, in the degree of variation in these performance measures that can be achieved during the reception of a live stream, and in the degree of variation in these performance measures for different receivers that are receiving the same live data stream. What is therefore needed is a system and method for communicating the content of a live data stream with improved parameters, such as high reliability, short startup time, and an extended protection period.

SUMMARY OF THE INVENTION

The present invention provides systems and methods for reliably communicating the content of a live data stream through the use of multiple channel transmission and reception. The systems and methods provide improved startup time, loss protection, and extended protection period compared to single channel systems.

In a particular embodiment of the invention, a method for communicating the content of a live data stream is presented. The method includes using two encoder channels to encode the content prior to transmission. Initially, a plurality of segments of a live data stream are received, wherein each segment contains segment data. A forward error correction algorithm is applied to each segment's data, thereby producing FEC-encoded segment data. The FEC-encoded segment data is contained within an FEC-encoded block, resulting in a corresponding plurality of FEC-encoded blocks being generated. Each FEC-encoded block is copied to a sub-channel on both a first encoder channel and a second encoder channel, resulting in a plurality of FEC encoded blocks residing on the first and second encoder channels. The first and second encoder channels differ in the number of sub-channels they contain (interleaving depth), and accordingly the arrangement of the FEC-encoded blocks in the first and second encoder channels is different.

A first cross-section of the FEC-encoded segment data contained within the FEC-encoded blocks resident in the first encoder channel is added to a first transmit block $T_0$. Similarly, A first cross-section of the FEC-encoded segment data contained within the FEC-encoded blocks resident in the second encoder channel is added to a second transmit block $T_1$. The first and second transmit blocks are then communicated to the receiver.

Other embodiments and aspects of the invention will be better understood by reference to the following drawings and detailed description of the present invention.

Figure 1:
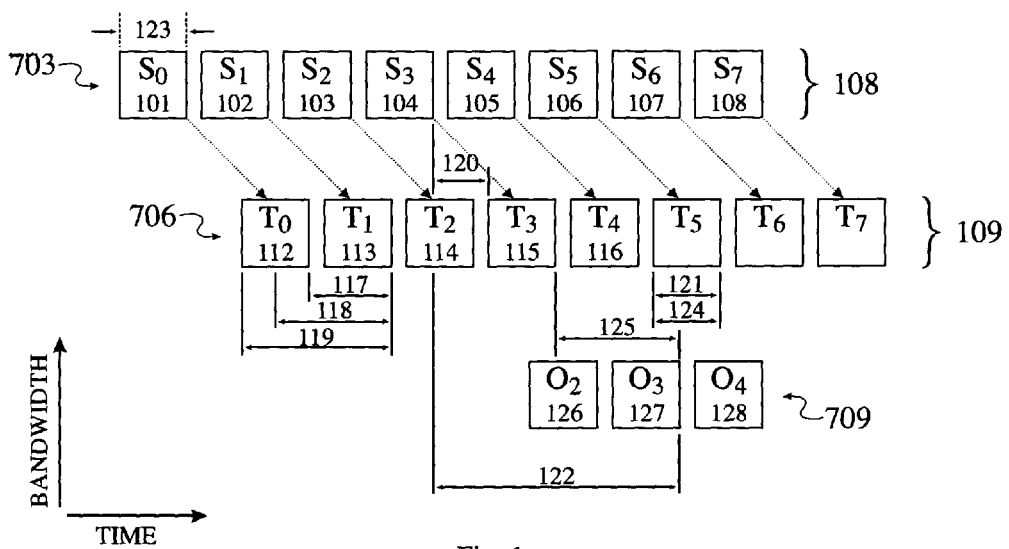
FIG. 1 illustrates a signal timing diagram for a single channel communication system.

For clarity and convenience, features and components which are identified in earlier drawings retain their reference numerals in subsequent drawings. Figures which contain graphs which plot time-vs-bandwidth are not necessarily to the same scale with respect to each other.

DETAILED DESCRIPTION OF THE INVENTION

System Architecture

Figure 7A:
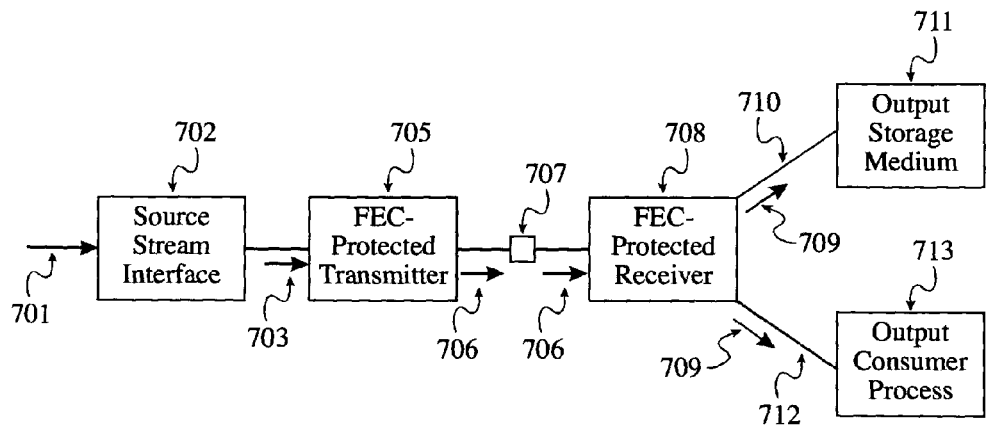
FIG. 7A illustrates a system for communicating data of a live stream in accordance with one embodiment of the present invention.

FIG. 7A illustrates a system 700 for communicating data of a live stream in accordance with one embodiment of the present invention. The system 700 includes a source stream interface 702 which receives the live stream 701, and outputs, in response, a corresponding stream of segments 703. In the preferred embodiment, the live stream 701 consists of information originating from a real time event, such as coverage of a sporting event, financial market data, a live news feed, emergency broadcast messages, and other sources from which real time data is sought. The source stream interface 702 partitions the live data stream into a segment stream 703 consisting of one or more segments $S_i$ transmitted in chronological order. Segments $S_i$ are preferably digitally formatted, and may consist of any type of data, such as IP packets, MPEG data, ATM cells, serial bytes, files in a shared storage medium, FDDI data, SCSI data and commands, or an API (application programming interface). Preferably, the transmitted blocks $T_i$ are composed of atomic medium blocks (AMBs) which are native to or optimally processed by the communication channel 707 and/or FEC-protected live stream receiver 708. In specific embodiments described below, the transmit blocks Ti will be composed of AMBs.

The term "channel" as used herein is an abstraction for a portion of the communication medium or media between the transmitter and the receiver(s); all the channels together constitute the medium or media used by the transmitter. The transmitter sends a sequence of AMBs on each channel; each receiver "subscribes" to some subset of the channels; and each receiver receives some subset of the AMBs sent on each of the channels that it is subscribed to. While receiving a live stream, a receiver may change the set of channels that it is subscribed to. In some embodiments of the present invention, the receiver changes it subscriptions for network congestion control. In some embodiments of channels, for example when a channel is an IP multicast group, the receiver may have difficulty quickly and reliably subscribing and unsubscribing to channels. Some embodiments of the present invention alleviate the difficulty.

A live data streaming system is not limited to the use of a single type of medium and hence several dissimilar AMBs may be used concurrently. For example, a satellite transmission medium may be used concurrently with a wire-line transmission medium. As would be clear to those skilled in the art, a single channel use in our abstraction may correspond to information being transmitted over a plurality of media. However, in preferred embodiments a single channel use would have a single mechanism for failure (loss).

The stream interface 702 may include signal reception and processing elements, such as an antenna or photo-optic lens for receiving RF or optical signals, an amplifier/attenuator for raising/lower the signal strength to a desired level, and conversion circuit (e.g., analog-to-digital converter) for converting the signal to the desired form.

The system 700 further includes an FEC-protected live stream transmitter 705 which FEC encodes each segment $S_i$ into a corresponding transmit block $T_i$, and transmits blocks $T_i$ over multiple channels or sub-channels in a transmit stream 706. This process by which blocks $T_i$ are transmitted over multiple channels or sub-channels is described in greater detail below. A particular advantage of the present invention is that the transmit blocks $T_i$ may be implemented over a bare transport of some sort, which does not implement a reliability layer and is not required to deliver atomic transport elements with order or timeliness guarantees. Possible embodiments of the transmit blocks $T_i$ include UDP packets, MPEG data streams, ATM cell streams, serial byte streams, file(s) in a shared storage medium, FDDI data streams or SCSI command and data streams, satellite transmissions, cellular phone transmissions, PCS transmissions, GSM transmissions, HDTV transmissions, or similarly-formatted transport.

The transmit stream 706 is communicated to an FEC-protected live stream receiver 708 (described in detail below) along a channel 707. The channel 707 may consist of a wired-line channel, including telephone line, coaxial or fiber optic cable, a terrestrial or satellite wireless channel, or a combination of these. Further, the channel may include a recording/storage device such as a tape drive, hard disk drive, memory, or other forms of medium which can be made to store the transmit stream 706 in its native format. A recording/storage device may be used to provide playback of earlier transmitted data.

An FEC-protected live stream receiver 708 receives the transmit blocks $T_i$ within the transmit block stream 706 and recovers the live stream data contained within the corresponding live data segment $S_i$. The output stream 709 can be supplied to an output storage medium 711 and/or a consumer process 713. The output storage medium 711 is operable to store data in the output stream 709 and may consist of any storage device such as CD-R/RW, DVD–R/RAM, SAN, volatile or non-volatile memory devices. The consumer process 713 is whatever uses the live stream data at the destination time and place. Examples of consumer processes include database systems, revision control systems, file mirroring systems, edge cache systems, delta propagation systems, audio/video/multimedia players, document archive systems, real-time telemetry systems, financial market ticker systems. Each of the channels 704, 707, 710, 712, 714 and 717 may consist of a wired-line channel, including telephone line, coaxial or fiber optic cable, a terrestrial or satellite wireless channel, or a combination of these.

Figure 7B:
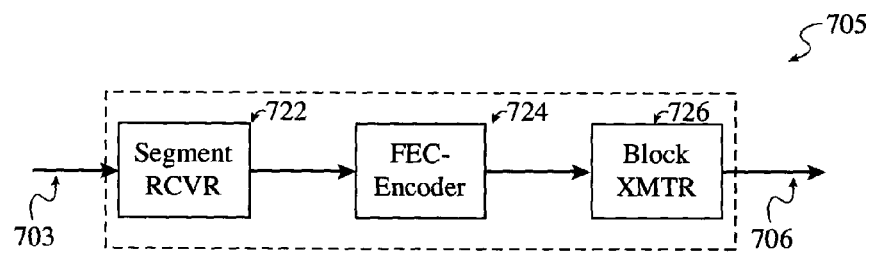
FIG. 7B illustrates a FEC-protected live stream transmitter in accordance with one embodiment of the present invention.

FIG. 7B illustrates the FEC-protected live stream transmitter (hereinafter "transmitter") 705 in accordance with one embodiment of the present invention. The transmitter 705 includes a segment receiver 722, an FEC encoder 724, and a multi-channel transmitter 726. The segment receiver 722 is operable to receive and process each segment $S_i$ of the segment stream 703. Depending upon the mode of communication between the source stream interface 702 and the transmitter 705, the segment receiver 722 may include components such as an antenna, amplifier, mixer, oscillator, analog-to digital converter, or other receiver circuitry used to recover signals in a wireless or hard-wired environment. In an alternative embodiment in which the source segment interface 702 provides each segment $S_i$ in the requisite state, the segment receiver 722 may be omitted.

The transmitter 705 further includes an FEC encoder 724 which converts each segment $S_i$ to a corresponding transmit block $T_i$. In one embodiment, the FEC encoder 724 is an information additive code generator as described in applicant's U.S. Pat. Nos. 6,307,487, 6,320,520, and 6,373,406. In another embodiment, the FEC encoder 724 is a sliding window encoder as described in applicant's U.S. Pat. No. 6,486,803. In a third embodiment, the FEC encoder 724 is a Reed-Solomon type FEC encoder known in the art. The invention is not limited to the use of any particular type of FEC algorithm, and an encoder using any FEC algorithm may be used in the present invention. In a specific embodiment, the aforementioned functions of the FEC encoder is realized by executing software code resident on a media such as volatile or non-volatile memory (in computers, embedded processors, etc.), or on a computer-readable medium such as a computer disk (e.g., floppy, CD, DVD disks, etc.), or other media forms on which software code can be made to reside.

In the most basic system, forward error correction (FEC) is applied through the following sequence of operations occurring substantially concurrently on different portions of the live data stream. First, the live data stream is partitioned into time-ordered segments $S_0$, $S_1$, $S_2$, . . . with common duration t seconds and common length K AMBs. (The live data stream may not naturally be in the same format as the transmission medium, but we may use the same units without loss of generality.) Then, an FEC code is applied separately to each $S_i$, the output of the code denoted $E_i$. Each $E_i$ has length N AMBs. The N AMBs for $E_0$ are transmitted on the medium, followed by the N AMBs for $E_1$, etc. At the time when segment $S_i$ is to be recovered, some fraction of the AMBs of $E_i$ are available. The FEC code guarantees that if L of the AMBs are available, $S_i$ can be recovered. The value of L is a property of the code. Reed-Solomon codes have the desirable property that L=K; however, the complexity of decoding necessitates small values for K and N. LT codes have L slightly larger than K and low complexity of decoding.

As earlier described, the terms loss protection and protection period are defined as follows: They are the largest fraction and time period, respectively, such that a loss fraction of AMBs at most equal to the loss protection over every window of duration equal to the protection period guarantees that the live data stream is recoverable. All other things being equal, large loss protection is clearly desirable. Large protection period is also desirable because averaging losses over a longer period lowers the highest loss fraction. For example, if the loss fractions for consecutive 1-second intervals are 0.01, 0.01, 0.09, 0.01, 0.01, 0.01, then the loss fractions for consecutive 2-second intervals are 0.01, 0.05, 0.01; the highest loss fraction is reduced.

With the straightforward application of FEC for live streaming, the receiver can reconstruct the live data stream if at least L AMBs are received for each $E_i$. Thus, the loss protection is (N−L)/N and the protection period is t. The startup time depends on when the receiver starts receiving the encoded data and ranges from t to 2*t.

In a particular embodiment of the invention illustrated in FIGS. 5A, 5B, 6A, 6B, 11A, and 11B, the FEC transmitter 705 further includes a block partitioner (not shown) which is operable to divide each of the transmit blocks $T_i$ into sub-blocks $T_{ia}$, $T_{ib}$, $T_{ic}$, etc. The transmitter (described below) subsequently transmits these blocks on either the same channel or different channels, as will be further described below.

The multi-channel transmitter 726 is operable to transmit blocks $T_i$ on separate channels or sub-channels, by a process that is explained in detail below. In one embodiment, the multi-channel transmitter 726 transmits blocks $T_i$ on multiple channels simultaneously, whereas in a second embodiment, the multi-channel transmitter 726 transmits blocks Ti on one channel at a time. The process of each embodiment is further described below. Depending upon the mode of transmission, the multi-channel transmitter 726 may include components, such as a digital-to-analog converter, oscillator, mixer, amplifier, and antenna to communicate blocks $T_i$ in a wireless environment. These or other components may be used in other transmitters used in a wired environment. In an alternative embodiment in which the FEC encoder is configured to output on multiple channels, the transmit blocks Ti in the desired signal state (analog/digital form, signal strength, carrier frequency, signal constellation, symbol rate, etc.), the multi-channel transmitter 726 may be omitted.

Figure 7C:
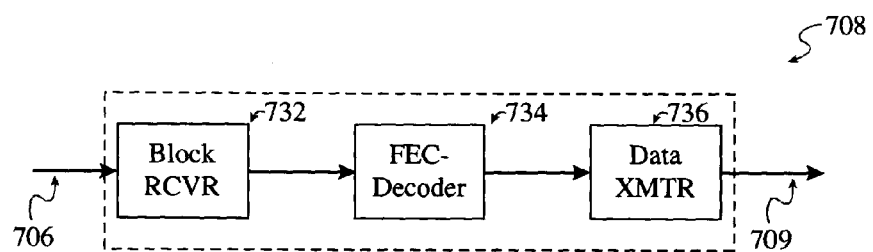
FIG. 7C illustrates a FEC-protected live stream receiver in accordance with one embodiment of the present invention.

FIG. 7C illustrates the FEC-protected live stream receiver (hereinafter "receiver") 708 in accordance with one embodiment of the present invention. The receiver 708 includes a multi-channel receiver 732, an FEC decoder 734, and a data transmitter 736. The multi-channel receiver 732 is operable to receive the transmitted blocks $T_i$ on separate channels or sub-channels, by a process that is explained in detail below. In one embodiment, the multi-channel receiver 734 receives blocks $T_i$ from multiple channels simultaneously, whereas in a second embodiment, the multi-channel receiver 734 receives transmit blocks $T_i$ from one channel at a time. The process of each embodiment is further described below. In the preferred embodiment, the multi-channel receiver will have components and circuitry complementary to that of the multi-channel transmitter. In an alternative embodiment in which the FEC decoder is configured to receive from multiple channels, the transmit blocks Ti in their received state, the multi-channel transmitter 726 may be omitted.

In system embodiments in which the transmitter 705 employs a data partitioner to divide the transmit blocks $T_i$ into sub-blocks, the receiver may additionally employ a block assembler (not shown) operable to reconstruct the $T_i$ transmit block from a collection of received Ti sub-blocks. The data assembler may either be located (functionally) ahead of the FEC decoder 734, in which case Ti block reconstrction occurs before FEC decoding, or after the FEC decoder 734, in which case the FEC decoder operates to FEC decode the data contained within each $T_i$ sub-block. In the latter case, the data assembler operates to combine the decoded data into the originally transmitted $S_i$ block.

The receiver 708 further includes an FEC decoder 734 which converts each transmit block $T_i$ into its corresponding $S_i$ segment. In one embodiment, the FEC decoder 724 is an information additive code decoder as described in applicant's U.S. Pat. Nos. 6,307,487, 6,320,520, and 6,373,406. In another embodiment, the FEC decoder 734 is a sliding window code decoder as described in applicant's U.S. Pat. No. 6,486,803. In a third embodiment, the FEC decoder 734 is a Reed-Solomon type FEC decoder known in the art. The invention is not limited to the use of any particular type of FEC algorithm, and an encoder using any FEC algorithm may be used in the present invention. In a specific embodiment, the aforementioned functions of the FEC decoder is realized by executing software code resident on a media such as volatile or non-volatile memory (in computers, embedded processors, etc.), or on a computer-readable medium such as a computer disk (e.g., floppy, CD, DVD disks, etc.), or other media forms on which software code can be made to reside.

Figure 4A:
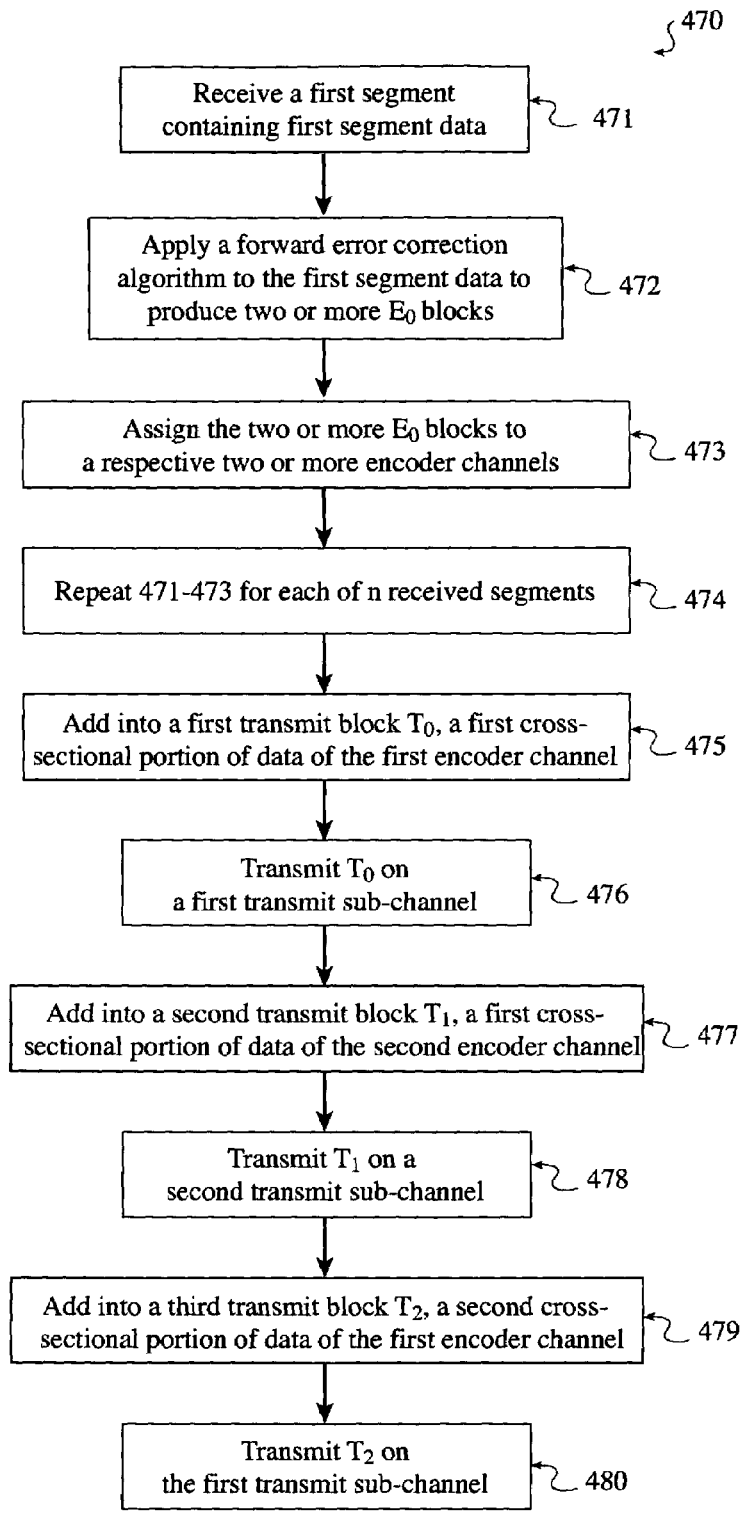
FIG. 4A illustrates a first method for communicating the content of a live data stream to a receiver via a plurality of channels in accordance with the present invention.
Figure 4B:
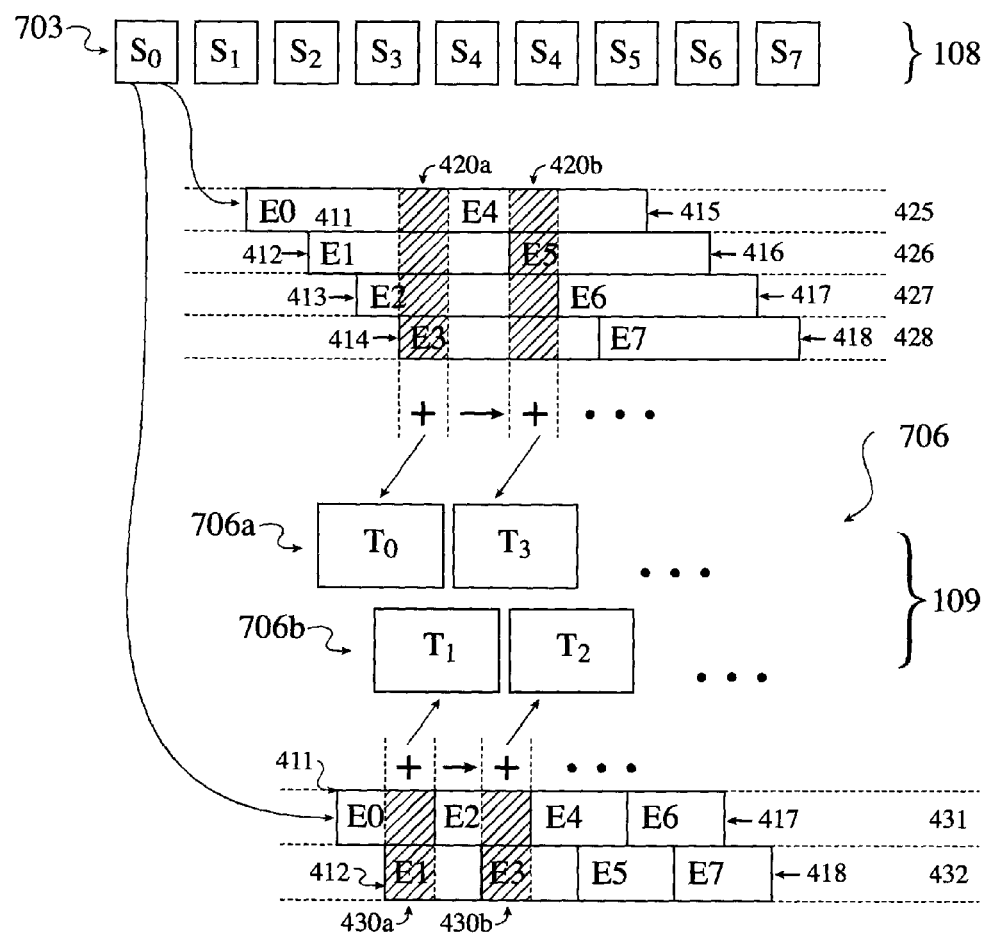
FIG. 4B illustrates a signal timing diagram for signals communicated in accordance with the method of FIG. 4A.

In a particular embodiment of the invention illustrated in FIGS. 4A and 4B, the FEC decoder 734 further includes a data parser (not shown) operable to separate, from a mixed group of distinct FEC-encoded segment data, all of the FEC-encoded first segment data into the first segment $S_0$, and all of the FEC-encoded second segment data into the second segment $S_1$ and so on. This process is further illustrated in FIGS. 4A and 4B below.

The receiver 708 further includes a data transmitter 736 operable to transmit the recovered $S_i$ segments in chronological order to produce the output stream 709. If required, the data transmitter 736 may include the aforementioned transmission components to convert the reconstructed live data stream 709 into the necessary signal state. Alternatively, in an embodiment in which the FEC decoder is configurable to output the segment $S_i$ in chronological order and requisite condition, the data transmitter 728 may be omitted.

As those skilled in the art will appreciate, the system of FIG. 7 may be extended to a point-to-multipoint system in which the data of the live stream is communicated to multiple receivers. This multicast or broadcast embodiment is especially advantageous in communicating real time data to multiple receivers over an unreliable network.

Figure 10:
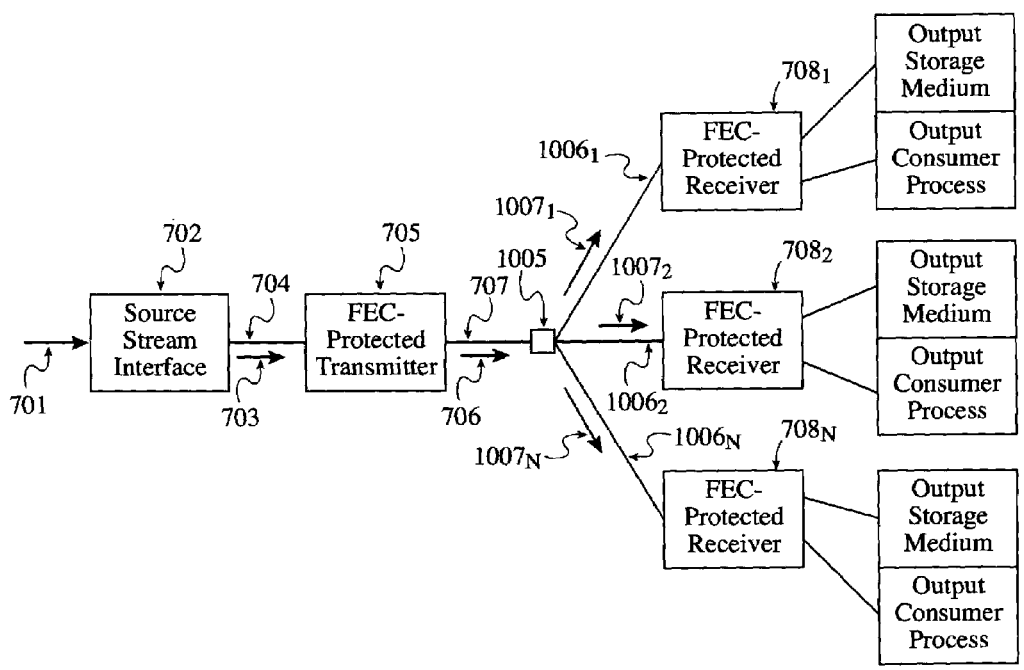
FIG. 10 illustrates a multicast system for communicating data of a live stream in accordance with one embodiment of the present invention.

FIG. 10 illustrates a multicast system 1000 for communicating data of a live stream in accordance with one embodiment of the present invention, with previously identified components retaining their original reference numerals. The multi-cast system 1000 includes, in addition to the previously-described source stream 702, transmitter 705, and transmitter storage medium 715 components, a communication network 1005 which is connected to each of N receivers $708_{1-N}$ via a respective N sets of channels $1006_{1-N}$. If the network 1005 is an IP multicast network, any two receivers, e.g., $708_1$ and $708_2$, are both receiving streams, e.g., $1007_1$ and $1007_2$, derived from the stream 706. Advantageously, they may have different reception rates, be subscribed to unequal sets of multicast groups, have unequal loss protection, and unequal protection periods while still taking advantage of the network bandwidth efficiency of IP multicast. If the network 1005 is an IP unicast network, the same flexibility exists and network bandwidth efficiency may be improved with application-layer multicast. In the cases of both IP multicast and IP unicast, the amount of FEC data produced by the transmitter is reduced as compared to having N separate, independent live data streams.

Communication Methodology

Figure 2:
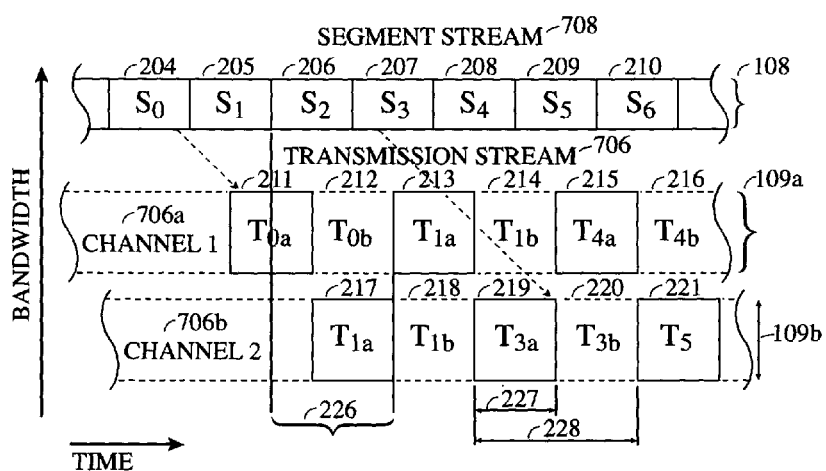
FIG. 2 illustrates a signal timing diagram for a two-channel communication system.
Figure 3:
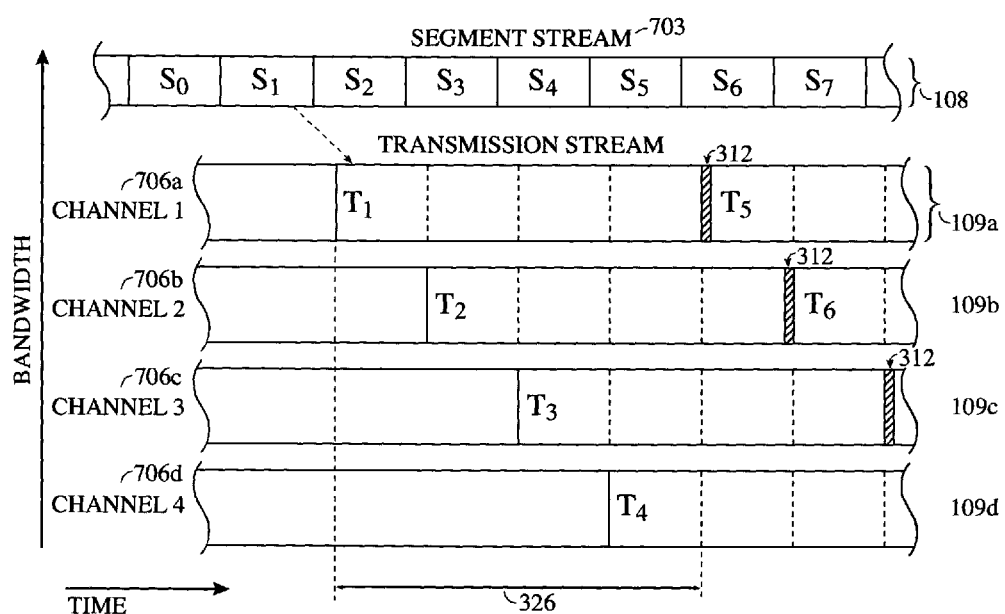
FIG. 3 illustrates a signal timing diagram for a four-channel communication system.

The methodology of the present invention is now illustrated by way of FIGS. 1-3 in which the signal timing diagrams of the segment stream 703 and transmit block stream 706 are shown for systems 700 having different configurations.

FIG. 1 illustrates the signal timing diagram for the segment stream 703, transmit block stream 706, and a part of the output stream 709 in which a single channel 707 is used to communicate the live stream data between the transmitter 795 and receiver 708. The segment stream 703 is made up of segments $S_{0-7}$ 101-108, each containing segment data. The height of the segment 108 corresponds to the amount of bandwidth consumed by the stream, referred to as the playback rate 108. The data available at any particular time in the segment stream 703 is represented by the horizontal position in the stream 703.

Also shown is a transmit block stream 706. The transmission block stream 706 has a certain amount of bandwidth available to it, represented by the height of the stream 109, referred to as the reception rate 109. The data available at any particular time in the transmit block stream 706 is represented by the horizontal position in the stream.

The segment stream 703 is comprised of segments which are labeled $S_0$ 101, $S_1$ 102 and so forth. For convenience in notation and figures, the segments are of equal duration. To those skilled in the art it will be clear that segments of unequal duration can also be accommodated. Each of these segments 101 . . . 108 is then encoded using the FEC protected live stream transmitter 705 and sent into the communications channel 707. The transmit blocks are shown as $T_0$ 112, $T_1$ 113, and so on in the figure. Segment $S_0$ 101 corresponds to transmit block $T_0$ 112, and so on. Each transmit block $T_0$-$T_7$ sized so that it takes the same duration (time) to transmit on the transmit stream 706 as it took receive on the segment stream 702. Stated another way, the segment period 123 is the same as the transmit block size 124.

In the preferred embodiment, the reception rate 109 is greater than the playback rate 108. In such an embodiment, protection against loss can be introduced through the use of forward error correction (FEC). The quantity of Loss Protection may be defined as the amount of data, expressed as a percentage, that can be lost from the transmit stream 706 while still offering a guarantee of reliable delivery.

The Loss Protection is defined as:

eq.(1):
$$\text{Loss Protection} = \frac{\text{Reception Rate} - \text{Playback Rate}}{\text{Reception Rate}} - \text{FEC coding overhead}$$

A second quantity which can be defined is the protection period 121. The protection period 121 is the maximum time period over which the receiver 708 can sustain the loss protection and still be able to receive the content successfully.

A third quantity which can be defined is the startup time. The startup time can be defined as the time the receiver will take to begin processing the received data, and several startup times are possible. In the worst case (119) in which the receiver 708 misses a first portion of a first transmit block $T_{-1}$ critical to decode it, the receiver must wait for its transmission to conclude as well as the next block's transmission before outputting the content of $T_0$, effectively waiting 2 transmit block periods. In the best case (117) in which the receiver 708 begins reception at the beginning of the $T_0$ block's transmission, the receiver 708 only needs to wait until it receives the complete block (one block period) before it can begin decoding and outputting that content. The nominal case (118) is simply the average of these two conditions, i.e., 1½ transmit block periods. The startup time may be expressed as a function of the protection period as the following equations:

Startup Time Worst Case=2*Protection Period     eq.(2)

Startup Time Average Case=1.5*Protection Period     eq.(3)

Startup Time Best Case=Protection Period     eq.(4)

The foregoing assumes that the FEC decoding does not add an appreciable time to the decode process. In instances in which it does, the startup times become accordingly longer.

With the implementation of particular FEC codes, specifically non-systematic block codes, for example, no output symbols are available until all input symbols are available. FIG. 1 assumes that this sort of FEC code is used. Therefore the output block $T_0$ 112 appears to the right of its corresponding source block $S_0$ 101 (later in time) and so forth for each block. The encoding time 120 is defined as the elapsed time between the end of $S_i$ segment to the beginning of the corresponding $T_i$ transmit block. With other FEC codes, specifically systematic codes, for example, it may be possible to begin to output symbols in $T_0$ 112 as soon as source symbols arrive in $S_0$ 101.

Referring to FIG. 1, the total time from the end of any segment $S_i$ to the end of its corresponding output block $O_i$ is defined as the lag time 122. This is the delay introduced by the present invention as perceived by either an output consumer process 713 or an output storage medium 711. The lag time includes the encode time 120 defined as the time required to encode an $S_i$ block into a corresponding $T_i$ block, and the decoding time 125 defined as the time required to decode the $T_i$ block into a corresponding $O_i$ block.

FIG. 2 illustrates the signal timing diagram for the segment stream 703, transmit block stream 706, and output stream 709 when the system 700 uses two channels 706a and 706b to communicate the live stream data. The transmitter 705 is configured to transmit multiple different and separate streams each at the reception rates 109a and 109b. Further, the receiver 708 is operable to join and leave the different channels 706a and 706b. Collectively, the two channels 706a and 706b represent the transmit stream 706.

As shown, the first channel 706a contains the even numbered transmit blocks while the second channel 706b contains the odd transmit blocks. In contrast to FIG. 1, each transmit block is transmitted for twice the duration which was available to the system in FIG. 1. This can be seen by looking at the transmit block $T_{0a}$ 211 and comparing it to the transmit block $T_0$ 112. In FIG. 1, the transmitter 705 ceases transmission of the FEC for segment $S_0$ 101 at the end of time period 112. In FIG. 2, the transmitter 705 can continue transmitting the FEC for Source Block $S_0$ 101 in both the time periods 211 212. This potentially doubles the protection period from the nominal protection period 227 which is equivalent to 121, to an extended protection period 228.

In operation, the receiver 708 monitors the first channel 706a until it has received sufficient FEC to generate the next output block in the output stream 709. Once the receiver 708 has collected enough data, it can leave that track and join the second channel 706b, alternating between the two.

Consider a receiver 708 which joins the first channel 706a before transmit block $T_{0a}$ 211. If the receiver 708 suffers more loss than the loss protection which would be afforded by the nominal protection period 227, then it can continue to stay on the first channel 706a until it has recovered enough transmit data. At some point, then inside transmit block $T_{0b}$ 212, the receiver 708 will leave the first channel 706a and join the second channel 706b, starting it's reception there partway thru transmit block 217. This operation shifts the receiver 708 "join" operation later in the transmission of each transmit block. If the receiver 708 continues to suffer more loss than the loss protection afforded by the nominal protection period 227, then eventually the receiver 708's "join" operation will come not in the first transmission block $T_{0a}$ 211 for a given source block $S_0$ 101, but instead at the start of the second block $T_{0b}$ 212 for that source block. When this happens, the receiver 708 cannot recover the output block for the source block $S_0$ 101, and must instead hop to transmit block $T_{1a}$ 217 for source block $S_1$ 102.

FIG. 3 illustrates the signal timing diagram for the segment stream 703, transmit block stream 706, and output stream 709 when the system 700 uses four channels 706a-d to communicate the live stream data. Particularly, there may exist a gap 312, i.e., a period of no transmission, between same-channel successively transmitted blocks, e.g., $T_1$ and $T_5$. Some advantages of such a gap are described in U.S. patent application Ser. No. 09/246,015, which is incorporated by reference herein. This example demonstrates how the configurations of FIGS. 2 and 3 may be generalized to an arbitrary number of channels.

It can be seen that the protection period 326 is extended to the number of channels times the duration of the segment block. The bandwidth taken across all the channels is the number of channels times the reception rate.

Protection Period=Transmit Period*Number of Channels     eq (5)

Bandwidth Consumed=Reception Rate*Number of Channels     eq (6)

While the protection period 326 can be increased easily with this method, it does so at potentially substantial costs in overall bandwidth used for the transmit block stream 706.

Figure 16:
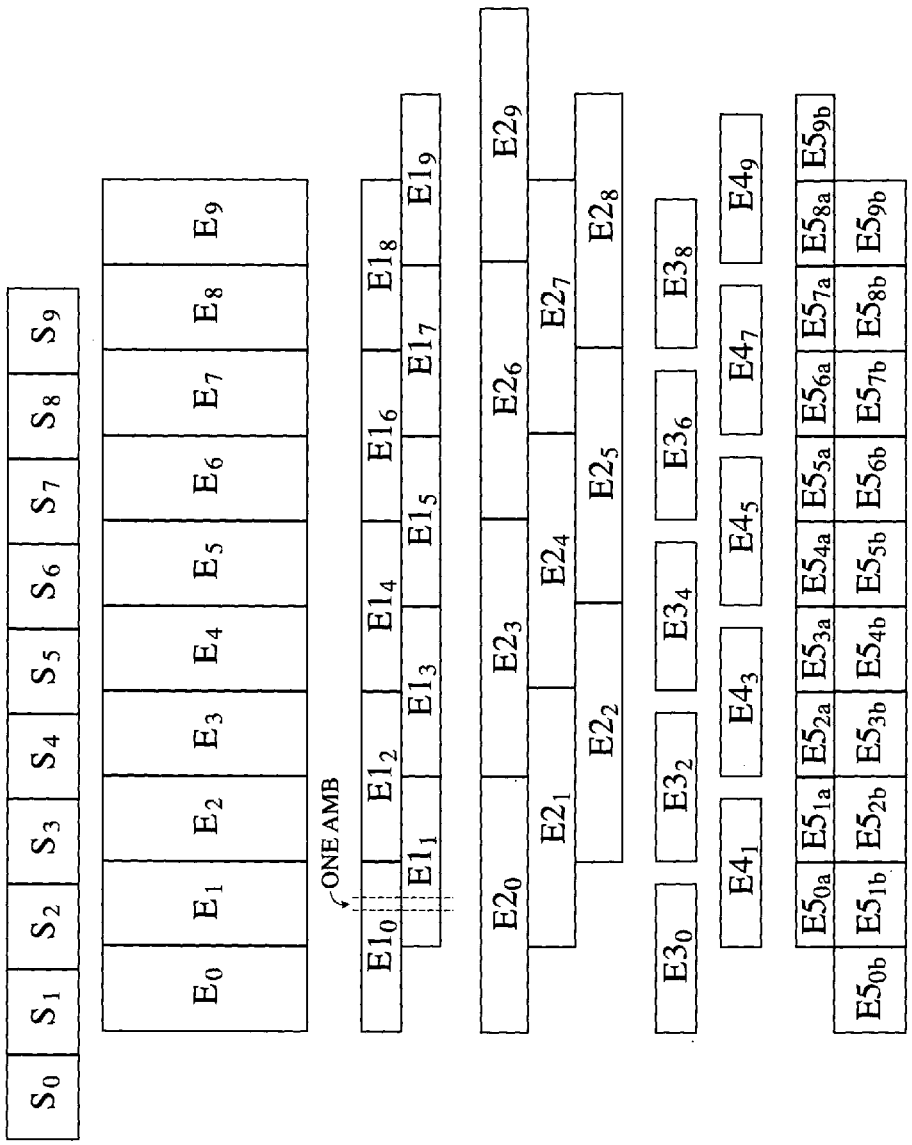
FIG. 16 illustrates examples of how encoded data is arranged for transmission on a plurality of channels in accordance with the invention.

FIG. 16 illustrates several examples of how encoded data is arranged for transmission on a plurality of channels in accordance with the invention. The source segments and encoded segments are as described above. Encoded data from an encoded segment $E_i$ is placed on channels where $EN_i$ (or $EN_{ia}$, and so on) is shown, where N is the channel number. Each unit of data within one channel is a distinct selection from the encoded segments. In some embodiments of the invention, one or more unit of data from an encoded segment is placed on more than one channel. Each AMB is formed by taking a slice of data vertically, so when two blocks are shown one on top of the other in the same channel, the AMBs for that period of time contain data from both blocks. The constant data rates of the channels is for illustration only; it is not a limitation of the invention. Channels 1 and 2 illustrate that the duration of transmission of data for any one encoded segment may vary and the number of encoded segments used to produce each AMB may vary. Channels 1 and 2 each alone carry information from every encoded segment. This is not a requirement, as shown in Channels 3 and 4.

Furthermore, Channels 3 and 4 illustrate that channels may be inactive between periods of transmission of encoded data. A possible advantage of this is to mitigate the adverse affects of delay in unsubscribing to a channel. Channel 5 illustrates that when data from a plurality of encoded segments is used to generate an AMB, the relative amounts of data from the encoded segments need not be equal. The present invention uses a plurality of these types of channels to communicate a live data stream. The descriptions below demonstrate preferred combinations of the uses of these channels. In these uses, the varying utilities of the channels cause them to be referred to as main channels, booster channels, hopper channels, etc.

The overview illustrated in FIG. 16 will now be illustrated in greater detail in the following four embodiments of the present invention.

Communicating Content Using Two or More Encoder Channels

FIG. 4A illustrates a method for communicating the content of a live data stream to a receiver via a plurality of channels in accordance with a first embodiment of the present invention, and FIG. 4B illustrates a signal timing diagram for the segment stream 703 and transmit block stream 706. In this embodiment, the plurality of channels consists of two or more encoder channels 420 and 430.

Referring now to method shown in FIG. 4A, the process begins at 471, when the first segment $S_0$ 401 containing first segment data is received. Next at 472, a forward error correction algorithm is applied to the first segment data to produce two, first FEC-encoded blocks $E_0$ 411, each $E_0$ block 411 containing FEC-encoded segment data from the first segment. In one embodiment of the FEC-encoding process, the Luby Transform (described in applicant's incorporated US patents) is applied to the segment data. In a second embodiment, a Reed-Solomon algorithm is applied to the segment data. The invention is not limited to the use of any particular FEC algorithm, and other FEC algorithms may be used in alternative embodiments of the invention. In an alternative embodiment of 472, only one E0 block is produced and that block copied as many times as needed to populate the other encoder sub-channels.

Next at 473, the two $E_0$ 411 blocks containing the FEC-encoded segment data are assigned to the first and second encoder channels 420 and 430, within sub-channels 425 and 431, respectively. As shown, the two blocks $E_0$ 411 may differ in their bandwidth-versus-time distribution of the first segment data (i.e., the FEC-encoded block $E_0$ 411 on the encoder sub-channel 431 has a higher data bandwidth versus time distribution compare to the $E_0$ 411 block on sub-channel 425), although in other embodiments the blocks may have the same bandwidth-versus-time distribution.

At 474, the processes of 471-473 are repeated for segment blocks $S_1$-$S_7$ 402-409, resulting in the assembly of the two encoder channels 420 and 430 as shown. In the particular embodiment shown, the first encoder channel 425 consists of 4 sub-channels (interleaving depth of 4), whereas the second encoder channel 430 consists of two channels (interleaving depth of 2). In a preferred embodiment, the two encoder channels 420 and 430 will differ in the number of sub-channels they contain with the least common multiple of the interleaving depth small.

At 475, a first cross-sectional portion of the FEC-encoded segment data residing within the FEC-encoded blocks $E_0$, $E_1$, $E_2$, and $E_3$ on sub-channels 424-428 (420a, shaded) is added to a first transmit block $T_0$. The first transmit block $T_0$ is then transmitted to the receiver via a first transmit channel 706a (process 476). Similar processes occur with respect to the second encoder channel 430, where at 477, a cross-sectional portion of data residing on sub-channels 431-432 (430a, shaded) is added to a second transmit block $T_1$, and, at 478, the T1 block is transmitted to the receiver along a second transmit sub-channel 706b. The terms first and second "sub-channels" denote separate channels used to transmit differing data content. Accordingly, the term "sub-channel" is not limited to a particular bandwidth or capacity, except that the bandwidth of all sub-channels will comprise the total bandwidth of the complete transmit stream 706.

Next at 479, a second cross-sectional portion of data residing on the first encoder sub-channels 425-428 (420b, shaded) is collected and added to a third transmit block $T_2$. which is, in turn, transmitted over the first transmit sub-channel 706a (process 480) Similarly, a second cross-sectional portion of data residing on the second encoder channel sub-channels 431-432 (430b, shaded) is collected and added to a fourth transmit block $T_3$. which is, in turn, transmitted over the second transmit sub-channel 706b. The process continues in the manner described to produce a two streams of transmitted blocks 706a and 706b, these streams collectively comprising the transmit stream 706. The time period between respective the first and second cross-sectional portions (e.g., 420a and 420b) is not required to be of any particular duration, and adjacent cross-sectional portions may either overlap, be contiguous, or have a gap therebetween as shown. Further, the duration (width) of each cross-sectional portion may be of any period, varying from vary short (narrow) to very long (wide).

While the process has been described in terms of two encoder channels 420 and 430, it is easily seen that additional encoder channels may also be used in an alternative embodiment under the present invention. In such an embodiment, three (or more copies of each FEC-encoded block $E_i$ are produced and supplied to three (or more) encoder channels. A cross-section of data from each of the three (or more) encoder channels can than be used to create three (or more) transmit blocks which are output on three (or more) transmit sub-channels. Further, the method may be used in conjunction with the systems and methods described below, e.g. booster channels, to communicate with the receiver.

During reception, the receiver can, depending upon bandwidth availability, collect either one of the transmit streams 706a or 706b, or both streams simultaneously. In the embodiment in which the receiver collects data from only one transmit stream, the receiver may be configured to switch reception channels periodically, or when certain conditions arise.

In a system embodiment of the invention described in FIGS. 4A and 4B, the transmitter includes the previously described segment receiver 722, the FEC encoder 724, and the block transmitter 726. The FEC encoder 724 may comprise an information additive code generator or a sliding window encoder as described in applicant's U.S. patents incorporated herein, a Reed-Solomon type FEC encoder known in the art, or any encoder using a forward error correction algorithm. The block transmitter 726 is preferably a multi-channel transmitter configured to transmit successive data blocks on alternate channels 706a and 706b, as shown in FIG. 4B. In alternative embodiments in which three or more transmit sub-channels are employed, the block transmitter is appropriately configured to transmit the blocks on a corresponding number of transmit sub-channels. The transmitter 705 further includes means for assigning each FEC-encoded block $E_i$ to the two encoder channels 420 and 430. Exemplary embodiments would include software programming to execute this function, or devices which can be programmed accordingly.

The receiver 708 in the system embodiment includes a block receiver 732, an FEC decoder 734, and a data transmitter 736. The block receiver 732 is preferably configured to either monitor simultaneously or switch periodically between the respective number of sub-channels transmitted by the transmitter 705. The FEC decoder may comprise the additive code decoder or a sliding window code decoder as described in applicant's U.S. patents incorporated herein, a Reed-Solomon type FEC decoder known in the art, or any decoder using a forward error correction algorithm. Preferably the receiver 708 further includes a data parser which operable to separate, from the cross-section of collected data, all of the FEC-encoded first segment data into the first segment $S_0$, and all of the FEC-encoded second segment data into the second segment $S_1$ and so on. Once separated into there corresponding segments, the segment data can then be output in the output stream 709 to either a consumer process or storage medium as shown in FIGS. 7A or 10.

Communicating Data Using a Main Channel and a Booster Channel

Figure 5A:
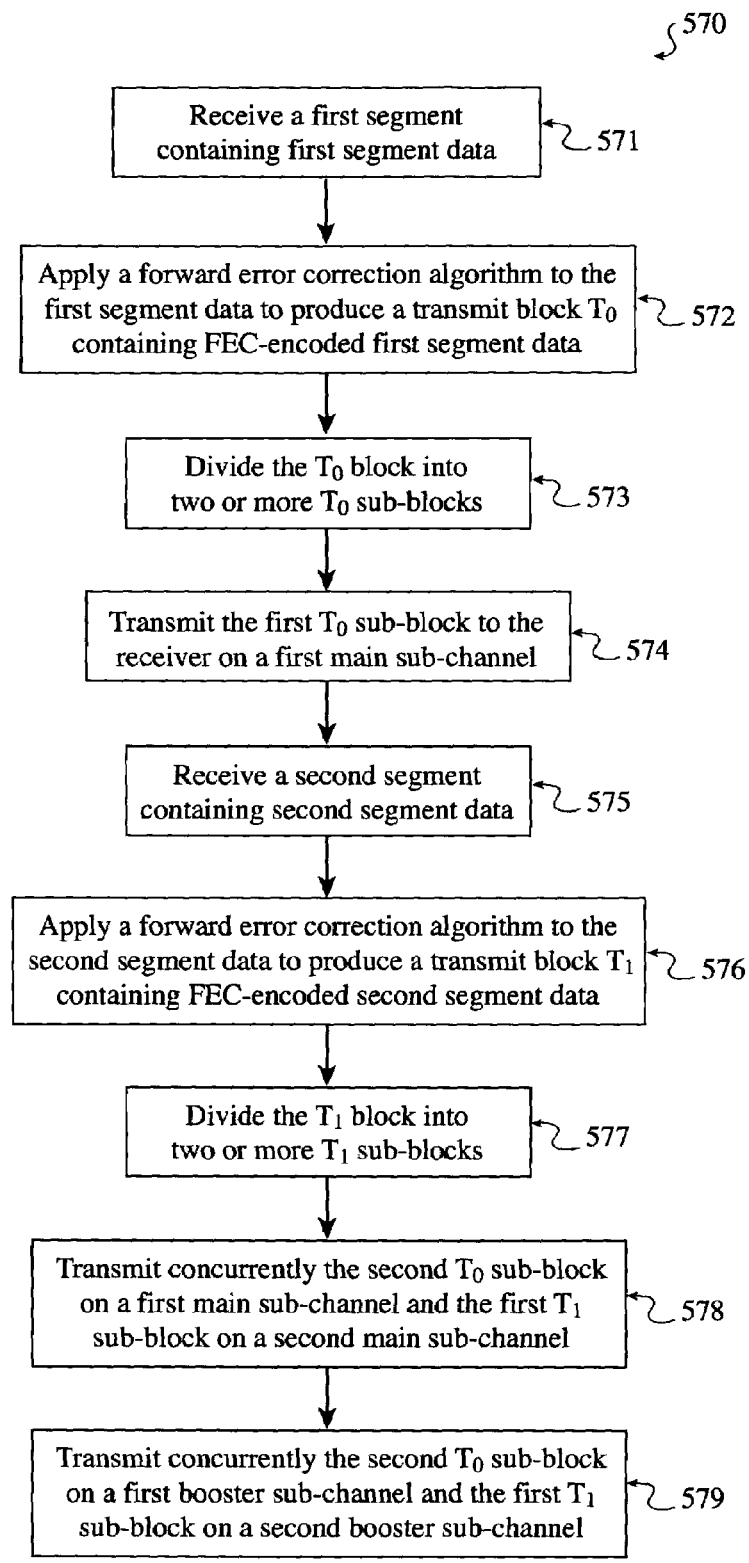
FIG. 5A illustrates a second method for communicating the content of a live data stream to a receiver via a plurality of channels in accordance with the present invention.
Figure 5B:
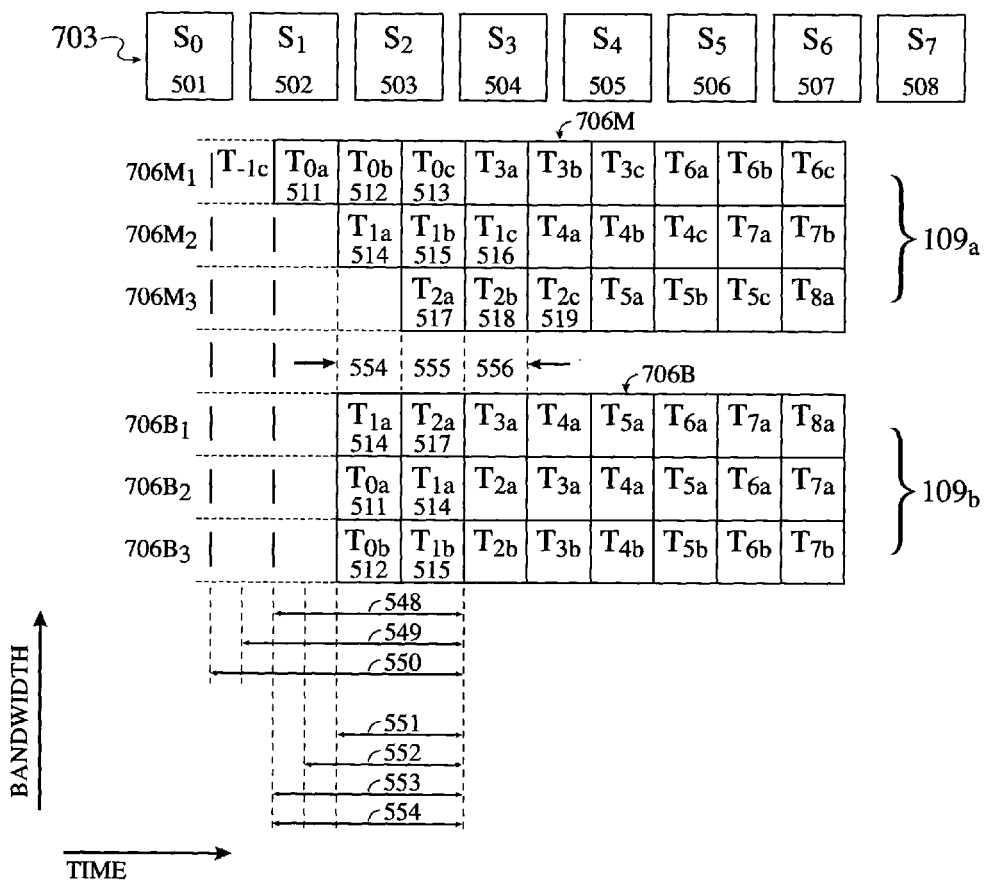
FIG. 5B illustrates a signal timing diagram for signals communicated in accordance with the method of FIG. 5A.

FIG. 5A illustrates a second method for communicating the content of a live data stream to a receiver via a plurality of channels, and FIG. 5B illustrates a signal timing diagram of the segment stream 703 and transmit block stream 706 as processed using this method. In this particular embodiment, the plurality of channels consists of at least one main channel 706M operating at a first reception rate 109a, and at least one booster channel 706B operating at a second reception rate 109b. The transmit blocks $T_i$ are, in essence, transmitted in the previously described time-staggered format (e.g., FIGS. 2 & 3), although in sub-divided $T_i$ portions in the instant embodiment. The sub-divided $T_i$ portions are used to improve the system startup time as will be further illustrated below.

Referring now to the method shown in FIG. 5A, the process begins at 571, when the first segment $S_0$ 501 containing first segment data is received. Next at 572, a forward error correction algorithm is applied to the first segment data to produce a first transmit block $T_0$ containing the FEC-encoded first segment data. As noted above, any FEC-encoding algorithm, including the Luby Transform or a Reed-Solomon Transform, may be used to encode the data. In the illustrated embodiment of FIG. 5B, the applied forward error correction coding outputs the FEC-encoded segment data after all of the first segment data is received.

In an alternative embodiment, the FEC-encoded data is produced as the segment data is being received before the entire segment is received.

At 573, first transmit block $T_0$ is sub-divided into two or more blocks. In the exemplary embodiment of FIG. 5B, the first transmit block $T_0$ is sub-divided into three blocks $T_{0a}$ 511, $T_{0b}$ 512, and $T_{0c}$ 513. In the preferred embodiment, sub-blocks $T_{0a}$ 511, $T_{0b}$ 512, and $T_{0c}$ 513 each comprise distinct data, i.e., they contain minimal, if any, common data. Next at 574, a first of the two or more sub-blocks is transmitted on a first main sub-channel. As shown in FIG. 5B, the first sub-block $T_{0a}$ 511 is transmitted on a first main sub-channel $706M_1$.

Next at 575, the second segment $S_1$ 502 containing first segment data is received. A forward error correction algorithm is subsequently applied to the second segment data to produce a first transmit block $T_1$ containing the FEC-encoded second segment data (process 576). At 577, the second transmit block $T_1$ is sub-divided into two or more blocks, which, in FIG. 5B consists of three blocks $T_{1a}$ 514, $T_{1b}$ 515, and $T_{1c}$ 516. As above, sub-blocks $T_{1a}$ 514, $T_{1b}$ 515, and $T_{1c}$ 516 each preferably comprise distinct data.

At 578, the second sub-block $T_{0b}$ 512 is transmitted on the first main sub-channel $706M_1$ substantially concurrent with the transmission of the first sub-block $T_{1a}$ 514 on the second main sub-channel $706M_1$. At 579, there is the concurrent transmission of $T_{1a}$ 514 on the first booster sub-channel $706B_1$ and $T_{0b}$ 512 on the second booster sub-channel $706B_2$.

As FIG. 5B illustrates, the aforementioned process may be repeated for additionally received segments $S_2$-$S_7$ 503-507, in which each segment is received, forward error corrected to a transmit block $T_{2-7}$, each transmit block divided into two or more sub-blocks, and the sub-blocks transmitted on the main and booster sub-channels as shown. In the preferred embodiment, the number of sub-divided blocks determines the number of receiver and booster sub-channels, the total bandwidth of which equals the reception rate 109.

In the particular embodiment of FIG. 5B, a first sub-block sequence, $T_{ia}$, i.e., $T_{1a}$, $T_{2a}$, $T_{3a}$, . . . is transmitted along the first booster sub-channel $706B_1$. As further illustrated, the first sub-block transmit sequence one block delayed, i.e., $T_{0a}$, $T_{1a}$, $T_{2a}$, $T_{3a}$, . . . is transmitted along the second booster sub-channel $706B_2$ The third booster channel $706B_3$ transmits a second sub-block sequence $T_{ib}$, i.e., $T_{0b}$, $T_{1b}$, $T_{2b}$, $T_{3b}$, . . . . The receiver 708 may have sufficient bandwidth to simultaneously monitor both the main channel 706M and the booster channel 706B. In another embodiment, the receiver channel is limited, for example, by its particular design, by network congestion, or by signal interference to monitor only one channel. In the latter case, the receiver 708 is preferably configured to monitor the booster channel 706B initially, and can switch its reception to receive transmits blocks $T_i$ either on the booster channel 706B or on the main channel 706M.

During reception, the receiver 708 listens to the booster channel 706B for the first transmit blocks, which in FIG. 5B consists of $T_{0a}$ 511, $T_{0b}$ 512 and $T_{1a}$ 514 in the time slot 554. The receiver subsequently switches to the main channel 510 to receive transmit blocks $T_{0c}$, $T_{1b}$, $T_{2a}$ during the next transmit slot 555. The corresponding pieces of the received sub-divided data are assembled, e.g., $T_{0c}$, $T_{1b}$ & $T_{1c}$, $T_{2a}$, . . . and FEC-decoded to recover the corresponding segment data. As illustrated, transmissions over the first and second time slots 554 and 555 will result in two-thirds of the second transmit block $T_1$ data being recovered ($T_{1a}$ & $T_{1b}$), which may be sufficient to recover the data contained within corresponding segment block $S_1$. As the process continues in time slots 556 and beyond, the later occurring transmit sub-blocks $T_{2i}$, $T_{3i}$, etc. will be received, the transmit blocks $T_2$, $T_3$, etc. reconstructed, and the data contained within their corresponding segments $S_2$, $S_3$ recovered.

As shown in FIG. 5B, without the booster channel, the best startup time 548 is the collective duration of the $T_{0a}$, $T_{0b}$, and $T_{0c}$ sub-blocks. The worst startup time 550 is this length plus one additional sub-block ($T_{-1c}$ shown). The average startup time without booster is ½ of a block additional to 548. With the booster channel the best, average, and worst case startup times 551, 552, and 553 are one sub-block shorter in duration compared to the system without a booster channel. The protection period 554 is the collective duration of the $T_{0a}$, $T_{0b}$, and $T_{0c}$ sub-blocks. With implementation of the main and booster channels 706M an 706B, the startup time can be described as follows:

Startup Time Worst Case=Protection Period      eq. (7)

eq.(8):

$$\text{Startup Time Best Case} = \text{Protection Period} - \frac{1}{\text{Number of Layers} * 2}$$

eq.(9):

$$\text{Startup Time Best Case} = \text{Protection Period} - \frac{1}{\text{Number of Layers}}$$

Although FIG. 5B illustrates three sub-channels, the method and system are scalable to support any number of sub-channels. As the number of main sub-channels increase, the number of booster sub-channel and the aggregate booster channel bandwidth required for the booster channels:

eq.(10):

$$\text{Booster Channels} = \text{integer}\left(\frac{\text{number of main sub-channels}}{2}\right)$$

Total Bandwidth=(Booster Channels+1)*Reception Rate      eq(11)

If there are an even number of tracks then one of the booster channels will be empty of data in alternating transmit time slots 554.

In a system embodiment of the invention described in FIGS. 5A and 5B, the transmitter includes the previously described segment receiver 722, the FEC encoder 724, and the block transmitter 726. The FEC encoder 724 may comprise an information additive code generator or a sliding window encoder as described in applicant's U.S. patents incorporated herein, a Reed-Solomon type FEC encoder known in the art, or any encoder using a forward error correction algorithm. The transmitter 705 preferably includes a block partitioner which is operable to divide each of the transmit blocks $T_i$ into sub-blocks $T_{ia}$, $T_{ib}$, $T_{ic}$. The block transmitter 726 is preferably configured to transmit the Ti sub-blocks on different main and booster channels in the manner described above. In an alternative system embodiment, the block partitioner is located (functionally) before the FEC encoder 724, and partitions the segment block Si into sub-blocks $S_{ia}$, $S_{ib}$, $S_{ic}$, etc. In such an embodiment, the FEC encoder 724 applies the forward error correction algorithm to the segment data in the segment sub-blocks to produce FEC-encoded segment data, the FEC-encoded segment data comprising corresponding transmit sub-blocks $T_{ia}$, $T_{ib}$, $T_{ic}$, etc.

The receiver 708 in the system embodiment of FIGS. 5A and 5B includes a block receiver 732, an FEC decoder 734, and a data transmitter 736. The block receiver 732 is preferably configured to either monitor simultaneously, or switch periodically between the respective main and booster channels in the manner described above. The FEC decoder may comprise the additive code decoder or a sliding window code decoder as described in applicant's U. S. patents incorporated herein, a Reed-Solomon type FEC decoder known in the art, or any decoder using a forward error correction algorithm. The receiver 708 further includes a block assembler operable to reconstruct the $T_i$ transmit block from a collection of received $T_i$ sub-blocks. The block assembler may either be located (functionally) ahead of the FEC decoder 734, in which case $T_i$ block reconstruction occurs before FEC decoding and the decoder provides the reconstructed segment data, or after the FEC decoder 734, in which case the FEC decoder operates to FEC decode the data contained within each $T_i$ sub-block. In the latter case, the block assembler operates to assembly the decoded segment data into an output stream 709 which is supplied to a consumer process and/or storage medium as shown in FIGS. 7A or 10.

Communicating Content Using Alternatively-Switched Channels

Figure 6A:
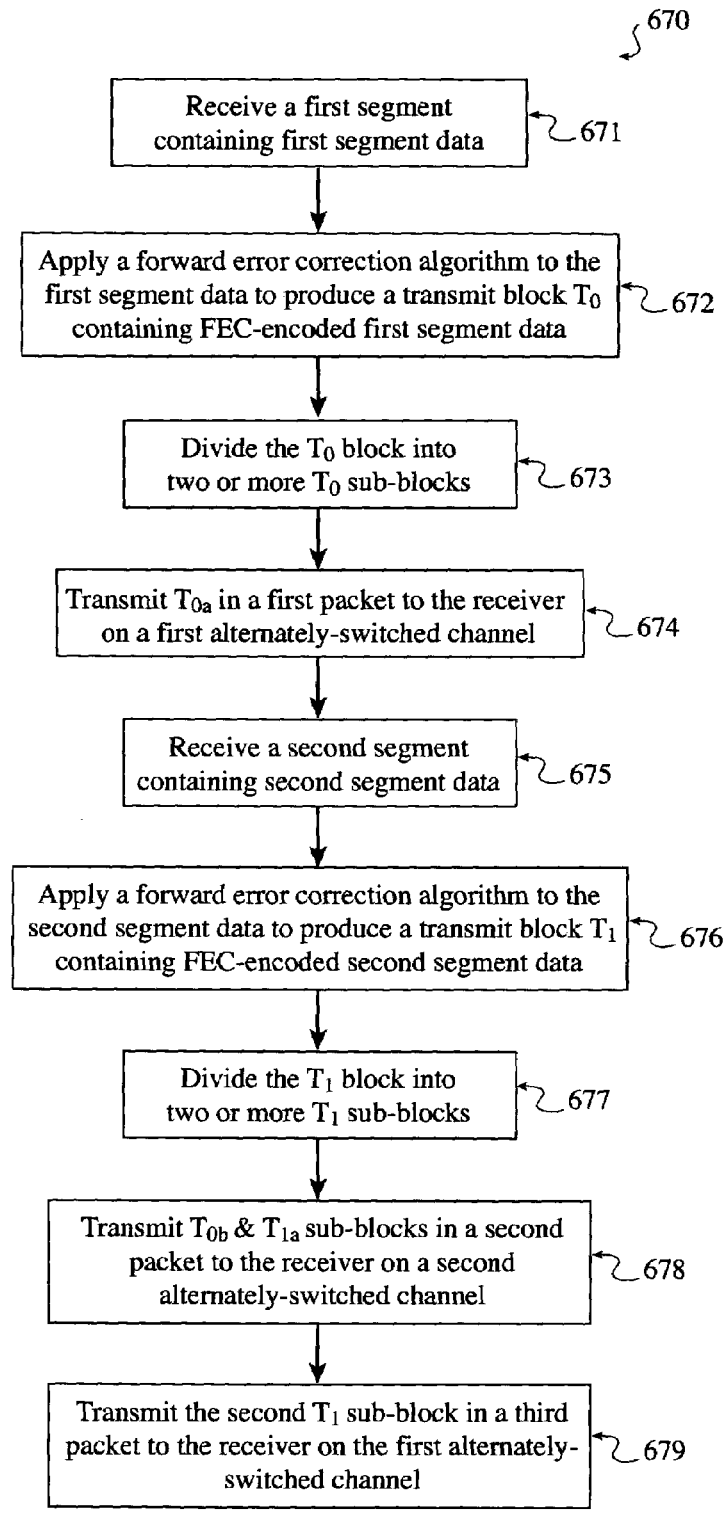
FIG. 6A illustrates a third method for communicating the content of a live data stream to a receiver via a plurality of channels in accordance with the present invention.
Figure 6B:
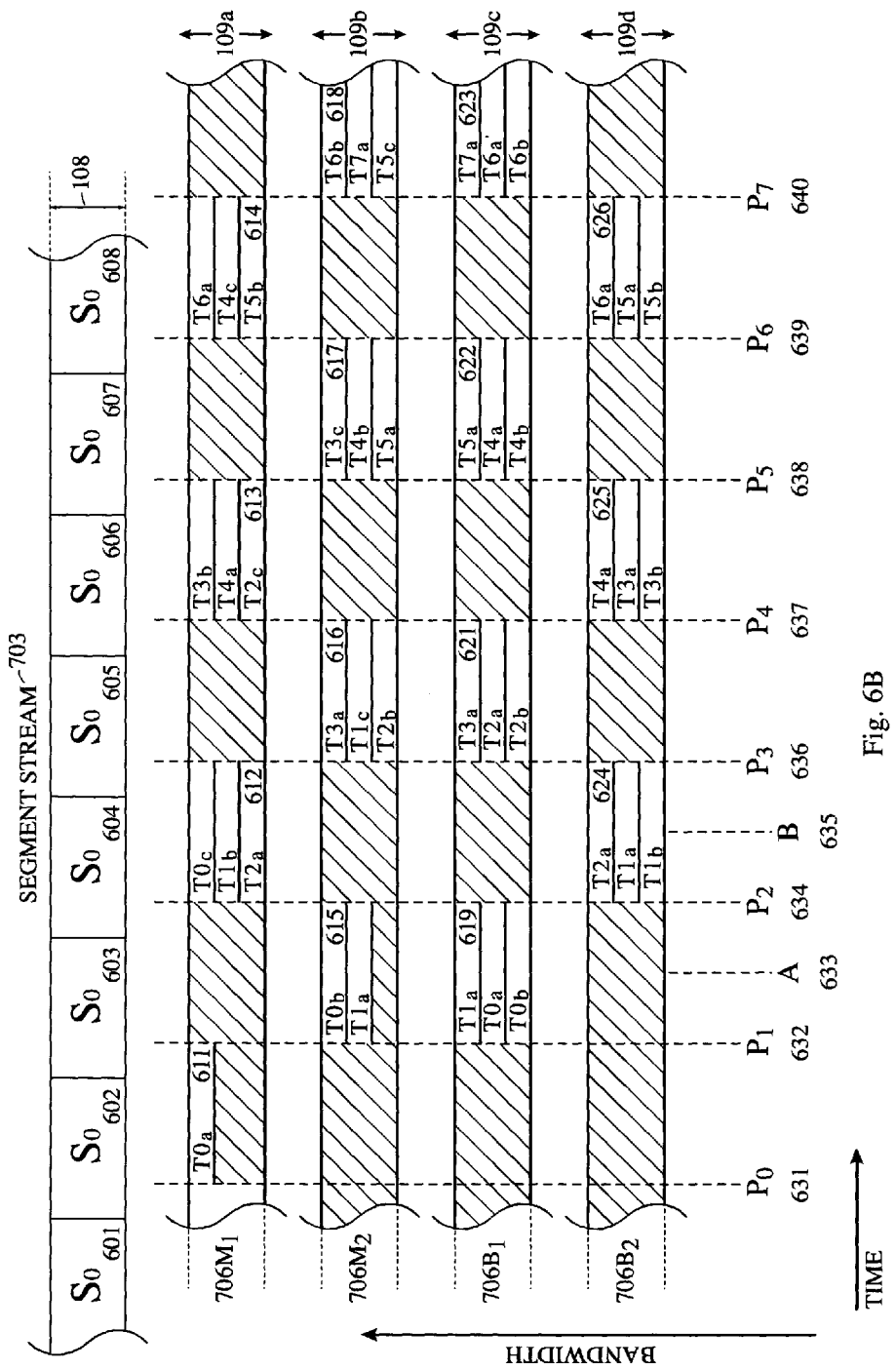
FIG. 6B illustrates a signal timing diagram for signals communicated in accordance with the method of FIG. 6A.

FIG. 6A illustrates a third method for communicating the content of a live data stream via a plurality of channels, and FIG. 6B illustrates a signal timing diagram of the segment stream 703 and transmit block stream 706 as processed using this method. In this particular embodiment, the plurality of channels consists of at least two alternately-switched main channels 706_M1 and 706_M2, and in a specific embodiment further includes two alternately-switched booster channels 706_B1 and 706_B2.

Referring now to the method shown in FIG. 6A, the process begins at 671, when the first segment $S_0$ 601 containing first segment data is received. Next at 672, a forward error correction algorithm is applied to the first segment data to produce a first transmit block $T_0$ containing the FEC-encoded first segment data. As noted above, any FEC-encoding algorithm, including the Luby Transform or a Reed-Solomon Transform, may be used to encode the data. In the illustrated embodiment of FIG. 6B, the applied forward error correction coding outputs the FEC-encoded segment data after all of the first segment data is received. In an alternative embodiment, the FEC-encoded data is produced as the segment data is being received before the entire is received.

At 673, first transmit block $T_0$ is sub-divided into two or more blocks. In the exemplary embodiment of FIG. 6B, the first transmit block $T_0$ is sub-divided into three blocks $T_{0a}$ (in packet 611), $T_{0b}$ (in packet 615), and $T_{0c}$ (in packet 613). In the preferred embodiment, sub-blocks $T_{0a}$, $T_{0b}$, and $T_{0c}$ each comprise distinct data, i.e., they contain minimal, if any, common data. Next at 674, a first of the two or more sub-blocks (e.g., $T_{0a}$) is transmitted on the first main channel 706_M1 in a first packet 611.

Next at 675, the second segment $S_1$ 602 containing first segment data is received. A forward error correction algorithm is subsequently applied to the second segment data to produce a first transmit block $T_1$ containing the FEC-encoded second segment data (process 676). At 677, the second transmit block $T_1$ is sub-divided into two or more blocks, which, in FIG. 6B consists of three blocks $T_{1a}$, $T_{1b}$, and $T_{1c}$. As noted above, sub-blocks $T_{1a}$ 514, $T_{1b}$ 515, and $T_{1c}$ 516 each preferably comprise distinct data.

At 678, sub-blocks $T_{0b}$ and $T_{1a}$ are transmitted in a second packet 615 on the second main channel 706_M2. At 679, the second of the two or more sub-blocks $T_{1b}$ is transmitted in a third packet 612 on the first alternately transmitted channel 706_M1.

As FIG. 6B illustrates, the aforementioned process may be repeated for additionally received segments $S_2$-$S_7$ 603-608, in which each segment is received, forward error corrected to a transmit block $T_{2-7}$, each transmit block divided into two or more sub-blocks, and the sub-blocks transmitted in packets alternately on the first or second main channels as shown. As illustrated, each of the $T_i$ segments is divided into three sub-blocks which populate packets alternately transmitted on the first or second main channels 706_M1 or 706_M2. In this embodiment, the third transmit packet 612 further includes a third of the three sub-blocks $T_{0c}$ from the first transmit block $T_0$ and the first of three sub-blocks $T2_a$ from the third transmit block $T_2$. Those skilled in the art will appreciate that the system and method can be scaled to operate with any desired number of block sub-divisions and main channels. This particular transmission system and method provides advantages in an IP network as no cost is incurred for those time slots in which no data packets are transmitted.

One or more of the above-described booster channels may be implemented in the present embodiment to further improve startup time performance. As shown in FIG. 6B, two booster channels 706_B1 and 706_B2 are used to alternately transmit packets containing $T_i$ sub-blocks. The packets 619, 624, and 621 may be populated in the same manner as shown in FIG. 5B, except that each successive sub-block is transmitted on a different channel, e.g., $T_{1a}$ is transmitted on the first booster channels 706_B1, $T_{1b}$ is transmitted on the second booster channel 706_B2, and $T_{0c}$ is transmitted on the first booster channel 706_B1. This process is repeated for the second segment sub-blocks $T_{2a}$, $T_{2b}$, and $T_{2c}$, and subsequent data blocks.

The receiving process employed in this embodiment closely parallels that described in FIGS. 5A and 5B, an exception being that whereas the previous system receiver was intermittently switchable between the main and booster channels, the receiver of the present embodiment is configured to switch reception between the first and second main channels at a substantially regular interval.

The method and system of FIGS. 6A and 6B work well for receivers which have high leave and low join latency, as well as for receivers which have low leave and high join latency. The terminology "leave latency" refers to the time it takes from when the receiver first signals the communications network that it wishes to no longer receive a particular channel until the communications network stops sending data on that channel. The terminology "join latency" refers to the time it takes from when the receiver first signals the communications network that it wishes to longer receive a particular channel until the communications network starts sending data on that channel.

Consider the case where a receiver 708 has very high leave and join latency. A receiver 708 join unsynchronized with respect to the beginning and ending of transmit blocks 611 . . . 626 and time slots 554. If the receiver 708 wishes to begin at the point in time labeled A 633, the receiver 708 would join both booster channel 706B$_1$ and booster channel 706B$_2$, since it does not know which contains data and which is idle at point A 633. At time A 633, the receiver 703 would determine that booster channel 706B$_2$ was idle and would leave that channel immediately. The receiver 708 would also know that since it was receiving transmit block 619 on booster channel 706B$_1$ that the next main channel which would be transmitting data would be main channel 706M$_1$, which would have transmit block 612 available. The receiver 708 could safely join main channel 706M$_1$ which was idle at time A 633. At time P2 634, the receiver 708 can leave booster channel 706M$_1$ (it has now left both booster channels) and it can join main channel 706M$_2$. At time B 635, the communications networks have processed all joins and leaves, the receiver 708 is receiving on both main channels 706M$_1$ and 706M$_2$, and neither booster channel.

In a system embodiment of the invention described in FIGS. 6A and 6B, the transmitter 705 includes the previously described segment receiver 722, the FEC encoder 724, and the block transmitter 726. The FEC encoder 724 may comprise an information additive code generator or a sliding window encoder as described in applicant's U.S. patents incorporated herein, a Reed-Solomon type FEC encoder known in the art, or any encoder using a forward error correction algorithm. The transmitter 705 preferably includes a block partitioner which is operable to divide each of the transmit blocks $T_i$ into sub-blocks $T_{ia}$, $T_{ib}$, $T_{ic}$. The block transmitter 726 is preferably configured to alternately transmit the $T_i$ sub-blocks on different main and booster channels in the manner described above. In an alternative system embodiment, the block partitioner is located (functionally) before the FEC encoder 724, and partitions the segment block Si into sub-blocks $S_{ia}$, $S_{ib}$, $S_{ic}$, etc. In such an embodiment, the FEC encoder 724 applies the forward error correction algorithm to the segment data in the segment sub-blocks to produce FEC-encoded segment data, the FEC-encoded segment data comprising corresponding transmit sub-blocks $T_{ia}$, $T_{ib}$, $T_{ic}$, etc.

The receiver 708 in the system embodiment of FIGS. 6A and 5B includes a block receiver 732, an FEC decoder 734, and a data transmitter 736. The block receiver 732 is preferably configured to alternately switch reception between the respective main and booster channels in the manner described above. The FEC decoder may comprise the additive code decoder or a sliding window code decoder as described in applicant's U.S. patents incorporated herein, a Reed-Solomon type FEC decoder known in the art, or any decoder using a forward error correction algorithm. The receiver 708 further includes a block assembler operable to reconstruct the $T_i$ transmit block from a collection of received Ti sub-blocks. The block assembler may either be located (functionally) ahead of the FEC decoder 734, in which case $T_i$ block reconstruction occurs before FEC decoding and the decoder provides the reconstructed segment data, or after the FEC decoder 734, in which case the FEC decoder operates to FEC decode the data contained within each $T_i$ sub-block. In the latter case, the block assembler operates to assembly the decoded segment data into an output stream 709 which is supplied to a consumer process and/or storage medium as shown in FIGS. 7A or 10.

Communicating Content Using a Long Protection Channel

Figure 11A:
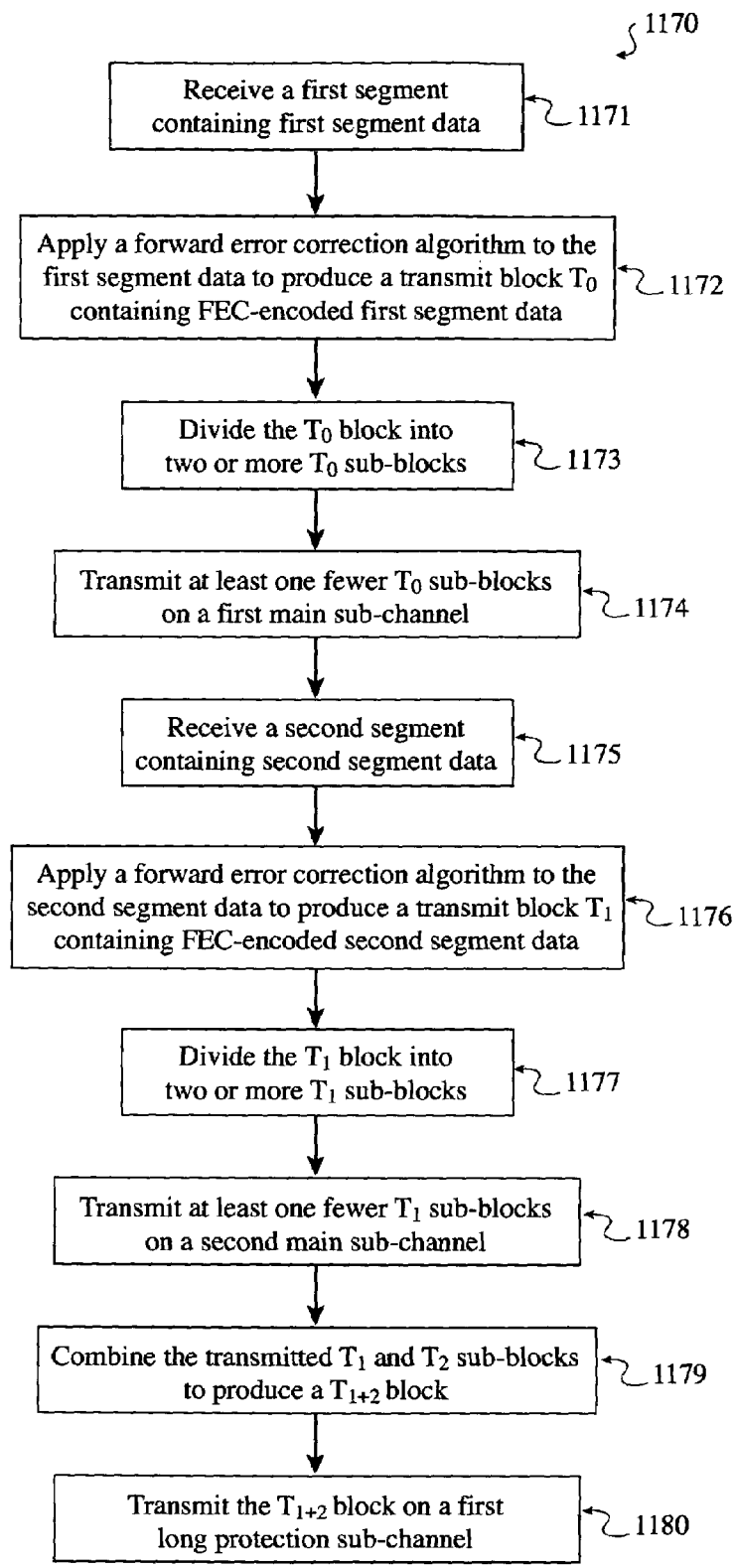
FIG. 11A illustrates a fourth method for communicating the content of a live data stream to a receiver via a plurality of channels in accordance with the present invention.
Figure 11B:
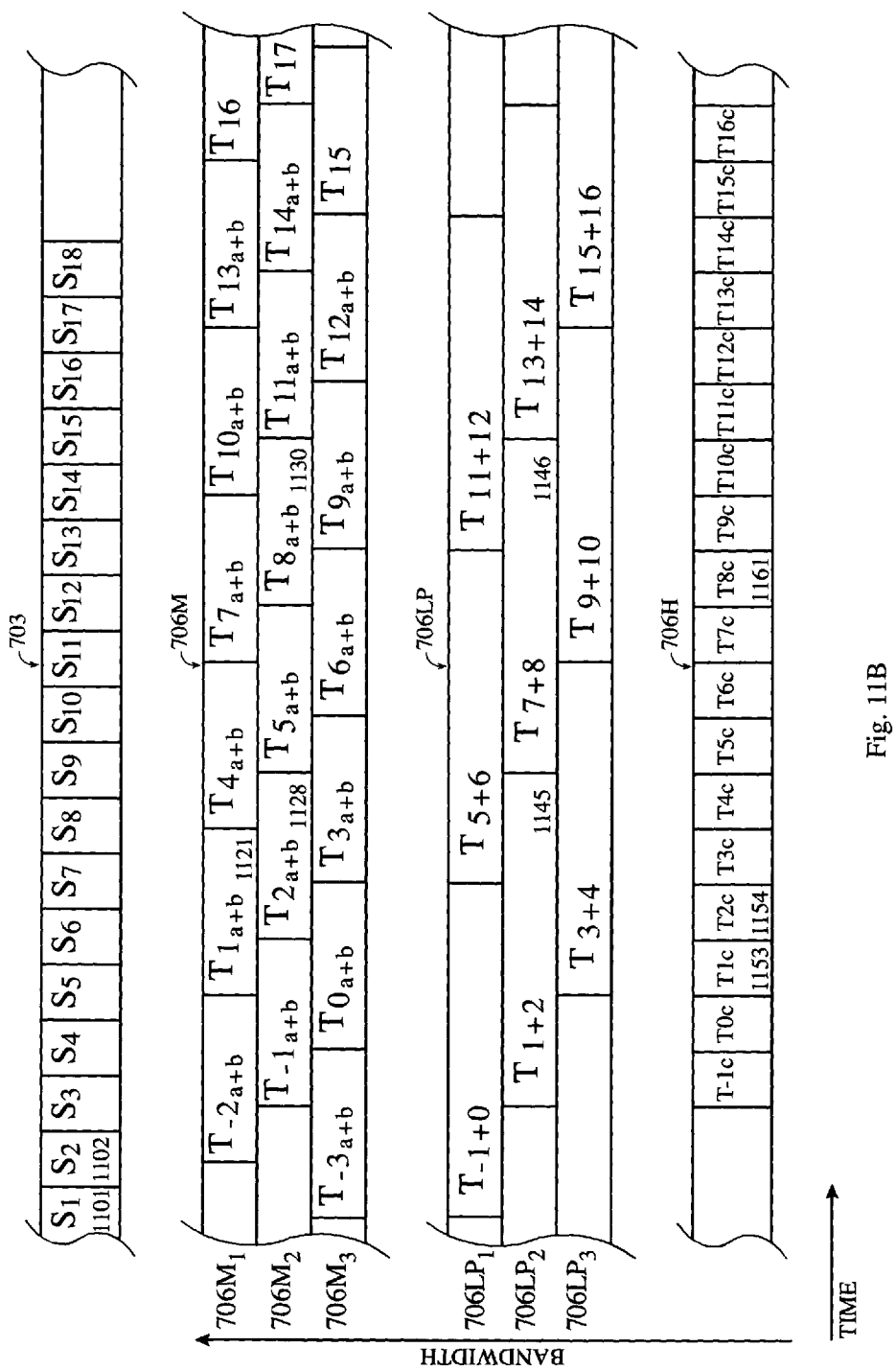
FIG. 11B illustrates a signal timing diagram for signals communicated in accordance with the method of FIG. 11A.

FIG. 11A illustrates a fourth method for communicating the content of a live data stream via a plurality of channels, and FIG. 11B illustrates a signal timing diagram of the segment stream 703 and transmit block stream 706 as processed using this method. In this particular embodiment, the plurality of channels consists of at least one main channel 706M, and at least one long protection channel 706LP, and at least one hopper channel 706H.

Referring to FIG. 11B, transmit blocks $T_i$ are divided two or more sub-blocks as earlier described. However, the present embodiment departs from those earlier described, as at least one fewer of the $T_i$ sub-blocks is transmitted along the main channel 706M in the earlier described time-staggered manner. The omitted at least one sub-block is transmitted instead along a hopper channel 706H. In further contrast, a long protection transmit block $T_{i+j}$ is formed by combining two or more transmit blocks $T_i$ and $T_j$ and transmitted on the long protection channel 706LP. Reception of the long protection data block $T_{i+j}$ is advantageous in that it provides greater immunity to noise or data loss than either the $T_i$ or $T_j$ blocks solely.

Referring now to the method shown in FIG. 11A, the process begins at 1171, when the first segment $S_1$ 1102 containing first segment data is received. Next at 1172, a forward error correction algorithm is applied to the first segment data to produce a first transmit block $T_1$ containing the FEC-encoded first segment data. As noted above, any FEC-encoding algorithm, including the Luby Transform or a Reed-Solomon Transform, may be used to encode the data. In the illustrated embodiment of FIG. 11B, the applied forward error correction coding outputs the FEC-encoded segment data after all of the first segment data is received. In an alternative embodiment, the FEC-encoded data is produced as the segment data is being received before the entire is received.

At 1173, first transmit block $T_1$ is sub-divided into two or more blocks. In the exemplary embodiment of FIG. 11B, the first transmit block $T_1$ is sub-divided into three blocks $T_{1a}$ $T_{1b}$, and $T_{1c}$. In the preferred embodiment, sub-blocks $T_{1a}$, $T_{1b}$, and $T_{1c}$ each comprise distinct data, i.e., they contain minimal, if any, common data.

Next at 1174, at least one fewer of the sub-blocks is transmitted on a first main channel. As shown in FIG. 11B, first and second sub-blocks $T_{1a}$ and $T_{1b}$ are transmitted on the first transmit sub-channel $706M_1$, and the third sub-block $T_{1c}$ 1153 is transmitted on hopper channel 760H.

Processes 1175-1178 repeat the aforementioned processes 1171-1174 for a second segment 1103 $S_2$, the outcome of which is the transmission of first and second sub-blocks $T_{2a}$ and $T_{2b}$ 1128 on a second transmit sub-channel $706M_2$, and the third sub-block $T_2$ 1154 transmitted on hopper channel 760H. At 1179, the transmitted $T_{1a}$, $T_{1b}$, $T_2$ and $T_{2b}$ sub-blocks are combined to produce a $T_{1+2}$ block 1145. At 1180, the combined $T_{1+2}$ block is transmitted on a long protection sub-channel $706LP_2$.

The receiving process employed in this embodiment is similar to that described in connection with FIGS. 5A and 5B, in which a receiver monitors a first channel and subsequently switches to a more reliable channel when certain conditions arise. In the present embodiment, the receiver is preferably configured to monitor the main sub-channels $706M_{1-3}$ and the hopper channel 706H either constantly on intermittently, e.g., when receiver bandwidth or signal conditions permit. When listening to both the main and hopper channels, the receiver may receive the $T_1$ sub-blocks $T_{1a}$ and $T_{1b}$ on the main channel and the distinct $T_1$ sub-block $T_{1c}$ on the hopper channel. In such an instance, when the loss is low enough, the receiver receives enough information to successfully recover segment $S_1$ early relative to the transmission of $T_2$ data on the main channel. The receiver subsequently switches it reception to the long protection channel 706LP to receive the transmit block $T_{1+2}$. The transmit block $T_{1+2}$ contains encoded data for the recovery of $S_1$ and $S_2$ together. In this way, the temporary use of the hopper channel has allowed the receiver to increase its protection period. The receiver could continue to use the hopper to increase its loss protection or, if there was a channel with yet longer protection period, to again increase its protection period. Those skilled in the art will appreciate that in a system with channels or combinations of channels giving a variety of protection periods and one or more hopper channels, a receiver can attain a variety of protection periods and loss protections; in particular, opportunistic use of hopper channels in periods of low network congestion allow the receiver to increase its protection period to improve performance for all subsequent periods of higher network congestion.

In a system embodiment of the invention described in FIGS. 11A and 11B, the transmitter 705 includes the previously described segment receiver 722, the FEC encoder 724, and the block transmitter 726. The FEC encoder 724 may comprise an information additive code generator or a sliding window encoder as described in applicant's U.S. patents incorporated herein, a Reed-Solomon type FEC encoder known in the art, or any encoder using a forward error correction algorithm. The transmitter 705 preferably includes a block partitioner which is operable to divide each of the transmit blocks $T_i$ into sub-blocks, e.g., $T_{ia+b}$, $T_{ic}$, etc. The block transmitter 726 is preferably configured to transmit the $T_i$ sub-blocks on different main and hopper channels in the manner described above. In an alternative embodiment, the block partitioner is located (functionally) before the FEC encoder 724, and partitions the segment block Si into sub-blocks, e.g., $S_{ia+b}$, $S_{ic}$, etc. In such an embodiment, the FEC encoder 724 applies the forward error correction algorithm to the segment data in the segment sub-blocks to produce FEC-encoded segment data, the FEC-encoded segment data comprising corresponding transmit sub-blocks $T_{ia}$, $T_{ib}$, $T_{ic}$, etc.

Further preferably, the transmitter 705 includes a block combiner which is operable to combine into a single block, e.g., $T_{1+2}$, the data of two separate transmit blocks, e.g., $T_1$ and $T_2$. The combined block is transmitted along the long protection channel 706LP as described above. In an alternative embodiment, the block combiner may be located (functionally) ahead of the FEC encoder 724 to combine the data of different segment blocks, e.g., $S_1$ and $S_2$, into a single segment block, e.g., $S_{1+2}$. In such an embodiment, the FEC encoder 724 applies the forward error correction algorithm to the combined segment data to produce the combined FEC-encoded block, e.g., $T_{1+2}$.

The receiver 708 in the system embodiment of FIGS. 5A and 5B includes a block receiver 732, an FEC decoder 734, and a data transmitter 736. The block receiver 732 is preferably configured to monitor substantially simultaneously the main and hopper channels 706M and 706H, and on command, switchable to the long protection channel 706LP in the manner described above. The FEC decoder 734 may comprise the additive code decoder or a sliding window code decoder as described in applicant's U.S. patents incorporated herein, a Reed-Solomon type FEC decoder known in the art, or any decoder using a forward error correction algorithm. The receiver 708 further includes a block assembler operable to reconstruct the entire $T_i$ transmit block from a collection of received Ti sub-blocks received from the main and hopper channels 706M and 706H. The block assembler may either be located (functionally) ahead of the FEC decoder 734, in which case $T_i$ block reconstruction occurs before FEC decoding and the decoder provides the reconstructed segment data, or after the FEC decoder 734, in which case the FEC decoder operates to FEC decode the data contained within each $T_i$ sub-block. In the latter case, the block assembler operates to assembly the decoded segment data into an output stream 709 which is supplied to a consumer process and/or storage medium as shown in FIGS. 7A or 10.

Many alternative receiver methods are possible. For example, similar to but distinct from increasing protection period, a receiver may use the hopper channels immediately upon joining a live data stream to reduce its startup time. Referring to FIG. 11B, suppose the receiver joins the main channel and hopper channel during the transmission of $T_{8c}$1161 and $T_{a+b}$ 1130. While it may not be possible to recover $S_7$, the receiver will generally be able to recover $S_8$ earlier than if the hopper channel was not used.

Transmission of codewords as exemplified by FIG. 11B makes some additional advantageous receiver methods computationally feasible when the FEC encoding uses the information additive codes described by U.S. Pat. Nos. 6,307,487, 6,320,520, and 6,373,406. With these codes, codewords from the encoded version of $S_i$ are useful in decoding larger blocks that include $S_i$. Thus, a receiver that is operating with the protection period of a long protection channel can receive codewords of shorter-protection channels to increase its robustness. For example, referring to FIG. 11B, a receiver may subscribe to the long protection channel and the hopper channel so that data received from $T_{8c}$ 1161 is used in decoding $T_{7+8}$1146. Those skilled in the art will appreciate that this technique applies with some other types of FEC encoding.

Booster Channel Construction

Figure 8:
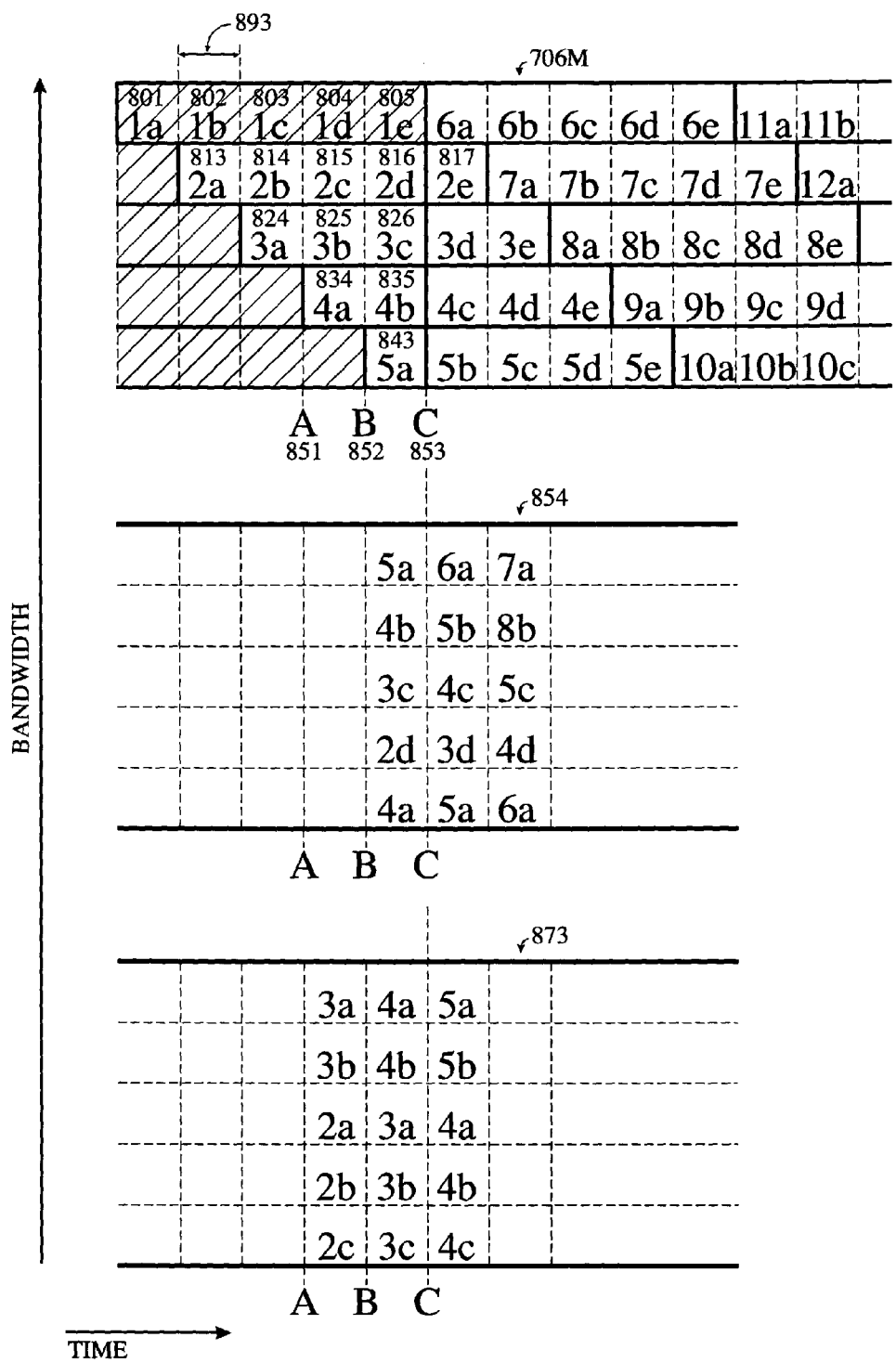
FIG. 8 illustrates a main channel, and first and second booster channels populated with content of a live data stream in accordance with one embodiment the present invention.

FIG. 8 illustrates a main channel 800, and first and second booster channels 854 and 873. In deciding how to populate the booster channels 854 and 873, an important consideration is to arrange the booster channel so that all the data received after the point at which we join A 851 is valid and usable for each receiver 708 who joins. Another preferable feature is that no additional FEC computations in the transmitter 703 should be required for these receivers 705, although rescheduling the duplicate transmission of blocks inside the transmitter 705 on booster channels is permitted.

In general half as many booster channels 706B are needed as there are channels carrying information from all segments, with varying protection periods 706M, following Formula 14. And similarly, at the point in time A 851 at which a receiver 708 joins, if there are more time slots 554 (FIG. 5B) passed for a set of transmit sub-blocks for any transmit block corresponding to a single segment block than there are booster channels, then the receiver cannot receive that block.

In FIG. 8, the receiver consists of five channels reception begins at point A 851. Since there are five channels, two booster channels 854 873 are needed. Because the transmission for transmit block set 2a 813, 2b 814, 2c 815, 2d 816, 2e 817 has two time slots to the left of A 851, it is known that $S_2$ will be the first block we will receive.

Consider the grid in the Main Channel 800. Block 1 is composed of sub-blocks 1a 801, 1b 802, 1c 803, 1d 804, 1e 805 cannot be received, since only one block remains in the future 1e 805. Accordingly, this entire block is hashed out. Reception returns to the main channel 800 at point C 853. Therefore, the blocks to the left of C 853 which are not hashed in are distributed along the two booster channels 854 873 in the two output periods between A 851 and C 853. These blocks are 2a 813, 2b 814, 2c 815, 2d 816, 3a 824, 3b 825, 3c 825, 4a 834, 4b 835, 5a 843. In the two lower grids in booster channel 1 854 and booster channel 2 873, there is shown the sub-blocks distributed between the two booster channels 854 873 in the two time slots 893. In the distribution shown, a receiver joins Booster Channel 2 873 first, joins Booster Channel 1 854 at point B 852, and then joins the main channel at Point C 853.

The specific allocation of the ten sub-blocks 2a 813, 2b 814, 2c 815, 2d 816, 3a 824, 3b 825, 3c 825, 4a 834, 4b 835, 5a 843 between the two booster channels 854, 873 is significant. In Booster Channel 1 854, where a receiver 708 is immediately before it hops to the Main Channel 800 at C 853, there is a constraint to have those blocks that are transmitted on the main channel between B 852 and C 853, by block 1e 805 is not needed. This constraint exists because these blocks are not available at any time before B 852. There are four such blocks in this example, 5a 843, 4b 835, 3c 826, 2d 816. The remaining block transmitted in Booster Channel 1 854 between B 852 and C 853 can be any of the remaining 10, and the remaining five must be transmitted on Booster Channel 2 873 between A 851 and B 852.

Note that by "moving" the sub-blocks 2a 813, 2b 814, 3a 824, 4a 834 in time, re-computation of new FEC sub-blocks (usually computationally expensive) is avoided. Accordingly, transmitter 705, in one embodiment, saves certain sub-blocks 2a 813, 2b 814, 3a 824, 4a 834] for retransmission on booster channels 706B$_{1-3}$ (FIG. 5B), and simultaneously transmits others 2c 815, 2d 816, 3b 825, 3c 825, 4b 835, 5a 843 on both the booster 854, 873 and main channels 800.

Figure 9:
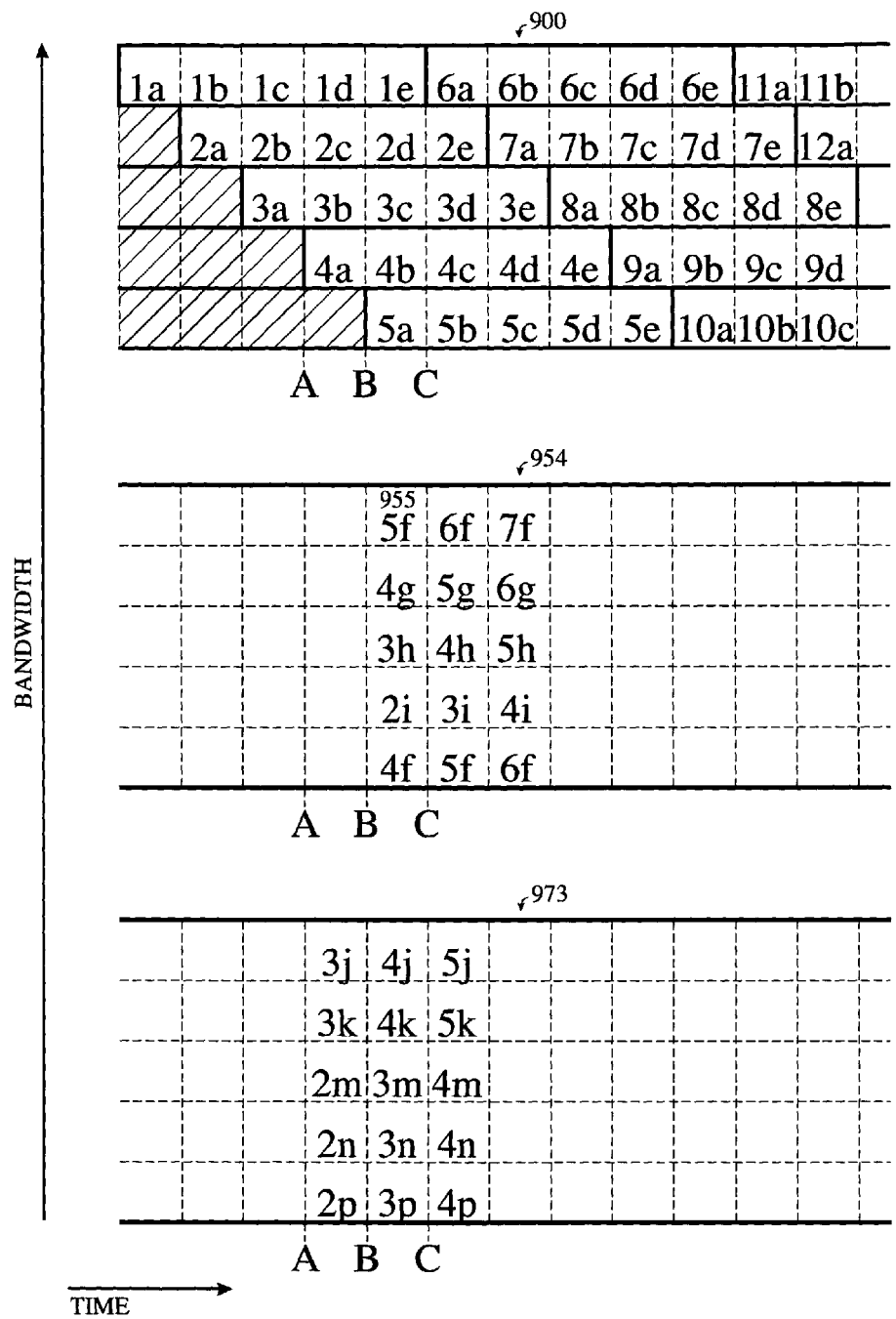
FIG. 9 illustrates a main channel, and first and second booster channels populated with content of a live data stream in accordance with a second embodiment the present invention.

FIG. 9 illustrates booster channels 954 and 973 populated using an method alternative to that described by FIG. 8. If it is computationally inexpensive to generate new FEC for the booster channel 954, 973 transmit blocks, then the booster channels 954, 973 can be populated with additional FEC generated from the corresponding segment blocks, rather than shifting the sub-blocks into the booster channel 954, 973 from the main channel 900 as shown in FIG. 8. Essentially this is a tradeoff between the cost of memory (to store blocks from previous periods) and the computational cost of the FEC. The individual transmit sub-blocks 5f 955 . . . are shown with a different letter subscript to indicate that these are not the same sub-blocks from the main channel 900.

Multi-layered Transmission

Figure 12:
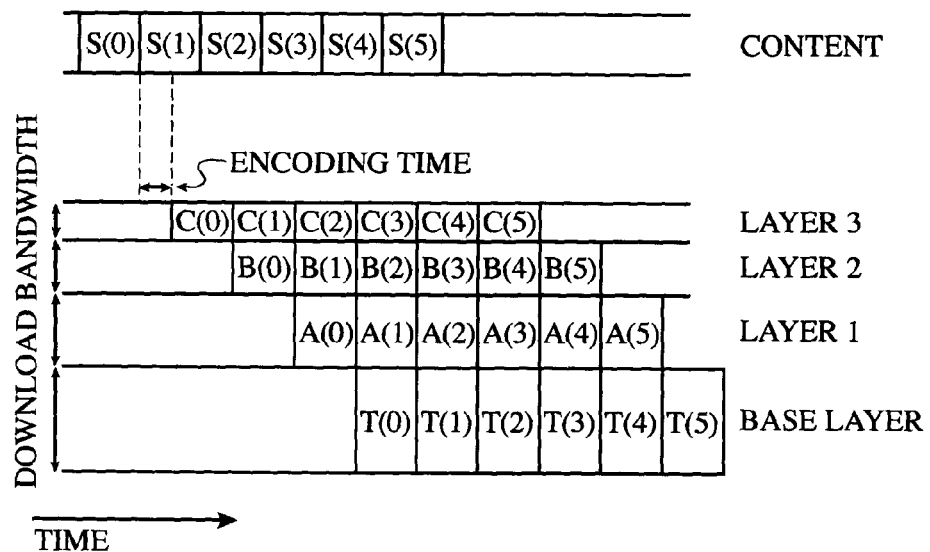
FIGS. 12-14 illustrate various embodiments of a layered transmission scheme in accordance with the present invention.
Figure 13:
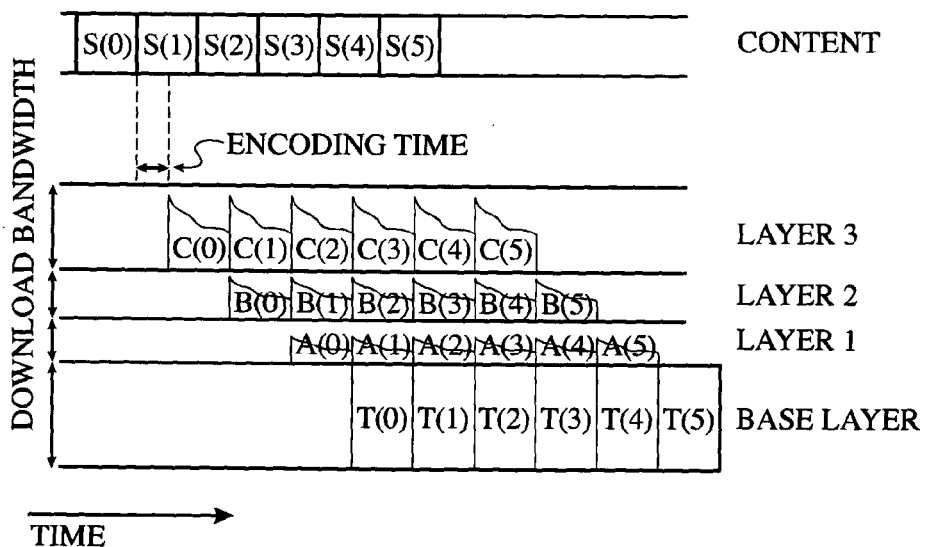
Figure 14:
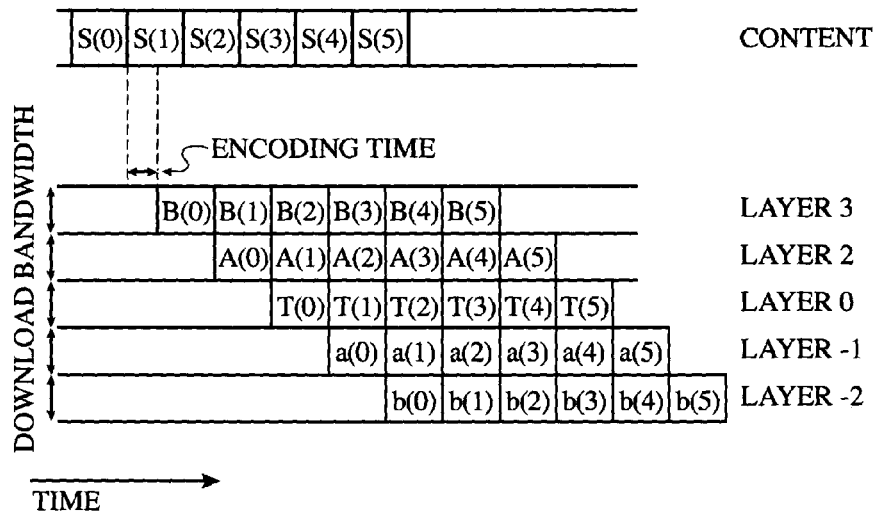

FIGS. 12-14 illustrate various embodiments of a layered transmission scheme. Layered transmission is useful for a variety of reasons; for example, it allows an individual receiver to continually adjust its behavior to best utilize its connection to the sender through the network.

In the embodiment of FIG. 12 the stream at the transmitter is divided into sections . . . , S(0), S(1), . . . . For each of these sections S(i) a number of blocks are produced which in FIG. 13 are called T(i), A(i), B(i), and C(i). While 4 blocks are depicted, a larger or smaller number may be used. These blocks are transmitted on different logical channels and possibly at different rates and at non-constant rates. Moreover, even though the duration of transmission of all these sections is equal in the example depicted in FIG. 13, this duration can be different for different sections so as to optimize parameters like the startup latency of the clients.

The blocks T(i), A(i), B(i), C(i), . . . are transmitted with a time-lag, as shown in FIG. 12. Specifically, T(i) is transmitted concurrently with A(i+1), B(i+2), C(i+3), . . . . The information contained in these blocks can be of different natures, depending on the application. For example, in some embodiments, T(i) is equal to S(i), and A(i), B(i), C(i), ... are redundant information computed using an error-correcting code such that any parts of T(i), A(i), B(i), C(i), ... which in aggregate are equal to or not substantially larger than S(i) is sufficient to recover S(i). In other embodiments, T(i) is also computed from S(i) using an error-correcting code such that it is possible to recover S(i) from T(i) only even in the face of losses. This can be especially important for clients that cannot subscribe to any other than the base transmission layer. In other embodiments of the invention, combining different layers corresponds to different quality levels of the media stream delivered by the server. The layers may be hierarchical, whereby subscribing to only the first layer results in reception of a coarse version of the stream, while subscribing to each additional layer in turn improves the quality of the received stream. The layers may also be non-hierarchical, whereby any combination of layers yields an approximate version of the stream. Certain embodiments of the invention apply layered FEC to each of several layers of the encoded media stream.

The effect of the time-lagged transmission of T(i), A(i), B(i), ... is as follows for the case where a single quality level for the media is desired and sufficient aggregate portions of T(i), A(i), B(i), ... allow the recovery of S(i). It will be apparent to those skilled in the art that the advantages of the time-lagged, layered transmission apply in numerous other configurations. If the client is subscribed only to the transmitted stream ..., T(0), T(1), T(2), ..., for flawless playback it must receive enough packets in each block T(i) to recover each of the corresponding S(i)s. The additional layers allow a client to receive packets that protect against future losses. For example, the simultaneous reception of T(i) and A(i+1) makes the client more able to withstand losses in T(i+1). The client can use any mechanism to determine which layers to subscribe to, and layers can be added and subtracted without regard to block boundaries. For example, the client can adjust the layers it is subscribed to dynamically to utilize available bandwidth. The available bandwidth could be asserted by an outside entity or inferred by the client itself.

In one illustrative embodiment of the invention, the transmission rates vary among the streams A(i), B(i), ..., and vary with time within the duration of each block, as shown in FIG. 13. The exact variation of the transmission rates depends on the application. The coded blocks are assigned to logical channels such that ..., C(i), B(i), A(i) are carried on the same channel, and at the end of the transmission of block A(i) the channel is unused for a period of time. A logical channel could, for example, correspond to a multicast group. A client that attempts to receive data at a rate higher than provided by stream T(i) alone joins these channels to receive data that protects against future loss. The arrangement of the coded blocks on the channels, resulting in decreasing rate on each channel, has the advantage of making it unimportant to leave a channel quickly when network losses are experienced. The times to join channels are adjusted using the mechanisms described in M. Luby, V. K. Goyal, S. Skaria and G. B. Horn, "Wave and Equation Based Rate Control Using Multicast Round Trip Time," Proc. ACM SIGCOMM 2002, pp.191-214, herein incorporated by reference. Other mechanisms for adjusting the reception rate will be apparent to those skilled in the art.

The number of different layers in the transmission depends among other things on the bandwidth constraints of the server and of the client. The layered scheme exemplified in FIG. 12 leads in certain embodiments to a reduction of the reception bandwidth of the client. For example, if the rates of A(i) and B(i) are both 50% of S(i), and the code used is able to recover the original section from any portion of the encoding which in aggregate is equal to the length of the original section, then A(i) and B(i) can be used to recover S(i), so that the client does not have to subscribe to T(i).

FIG. 14 describes an alternative embodiment of the layered transmission that provides several additional features. In this illustrative example, the transmitter produces five blocks, B(i), A(i), T(i), a(i), and b(i), from each section S(i). In practice, any number of blocks may be produced that is consistent with the resource constraints of the server and of the clients. Consistent with the invention, the layer carrying the oldest data (Layer-2 in FIG. 14) is not necessarily the base layer for normal operation. The client starts by joining Layer 0, and sets its playout time accordingly to be such that content segment S(i) is played out at a delay from the end of the reception of T(i); the delay is primarily the time for decoding but may be greater. Joining higher numbered layers gives packets that protect against losses in the future, as described above. However, it is possible that losses are sufficient to make recovery of S(i) unlikely. In this case, the client joins layers lower than Layer 0. The additional data from the lower layers make recovery of S(i) possible. If the scheduled playout time for section S(i) has passed, the player pauses and plays out data at a schedule delayed from the original playout schedule. Operating now delayed with respect to the original playout schedule, the client has more layers available for added protection from future loss. If the reception tends to catch up to the original schedule, the client may use one of several methods to temporarily increase the playout rate. These techniques include removing portions of the media stream and allowing a fast forward operation.

Sliding Window Encoding

Application of traditional FEC schemes for protection of transmitted information against losses requires blocking the data. The boundaries of the blocks may be unnatural for the specific type of data to be transmitted. For example, if the data corresponds to streaming of a live event, the original data may be delivered in a blocked form suitable for playback with a specific player. In that case the boundaries of the FEC blocks would preferably have to conform to these boundaries, which would put additional constraints on the code used. Moreover, the blocking of data for FEC purposes offers only protection against a certain fraction of losses within that block. Unfavorable erasure patterns could lead to two or more unrecoverable blocks.

Figure 15:
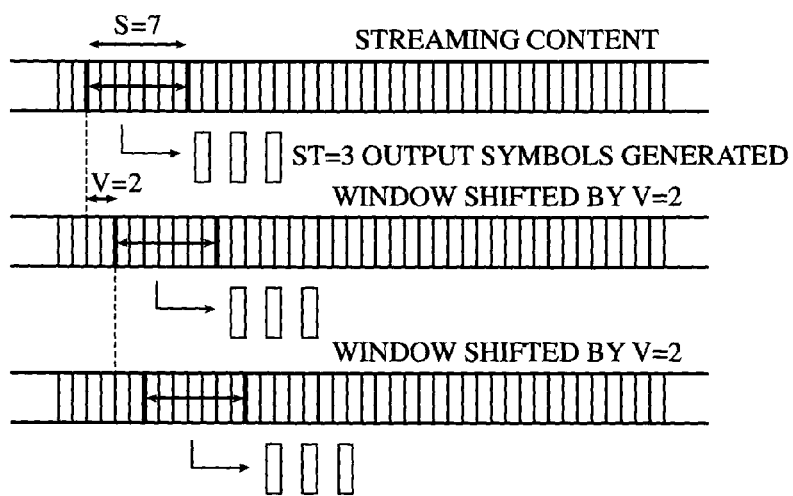
FIG. 15 illustrates the application of sliding window encoding in accordance with the present invention.

FIG. 15 illustrates the application of sliding window encoding in accordance with the present invention. Related embodiments of sliding window encoding are described in applicant's U.S. Pat. No. 6,486,803, herein incorporated by reference. In the example of FIG. 15, it is assumed that input data is blocked into atomic units called input symbols. The size and nature of these units depends on the particular application. In some cases, the size of these symbols could be the same as the size of an AMB. In other applications, the symbols could be smaller than AMBs.

In some embodiments of this invention, the server chooses a window size S, a shift speed of V transmissions per window, and a window step-size ST. The current window consists of S consecutive input symbols. Then V output symbols are generated from the input symbols within the current window. The exact method of generation of these symbols depends on the particular application. In some embodiments, the output symbols are generated according to an information additive encoder, as described in U.S. Pat.

No. 6,320,520 and which is incorporated by reference herein. In other embodiments, the symbols can be generated according to a fixed rate code like a Reed-Solomon or a Low-Density Parity-Check Code. After generating V output symbols, the window is shifted by ST input symbols, and the procedure is repeated. The choice of S, V, and ST depends on the particular application.

Documents Herein Incorporated by Reference

The following documents are herein incorporated by reference in their entirety for all purposes:

U.S. Pat. No. 6,486,803, entitled "On Demand Encoding with a Window";

U.S. Pat. No. 6,320,520, entitled "Information Additive Code Generator & Decoder For Communication Systems"

U.S. Pat. No. 6,307,487 entitled "Information Additive Code Generator & Decoder For Communication Systems"

U.S. patent application Ser. No. 09/587,542, entitled "Dynamic Layer Congestion Control for Multicast Transport";

U.S. patent application Ser. No. 09/68,843, entitled "Method and Apparatus for Scheduling, Serving, Receiving Media On-Demand for Clients, Servers Arranged According to Constraints on Resources";

U.S. Provisional Patent Application Ser. No. 60/357,443, entitled "System and Method for Live Data Transmission;"

U.S. Provisional Patent Application Ser. No. 60/254,514, entitled "Method for Media on Demand Clients & Servers with Constrained Resources";

"Wave and Equation Based Rate Control Using Multicast Round Trip Time," M. Luby, V. K. Goyal, S. Skaria, and G. B. Horn, Proc. ACM SIGCOMM 2002, pp.191-214;

"TCP-like congestion control for layered multicast data transfer," L. Vicisano, L. Rizzo, and J. Crowcroft, Proc. IEEE INFOCOM, vol. 3, pp. 996-1003, San Francisco, Calif., March-April 1998; and "FLID-DL: Congestion Control for Layered Multicast," J. Byers, M. Frumin, G. Horn, M. Luby, M. Mitzenmacher, A. Roetter and W. Shaver, Proc. $2^{nd}$ Int. Workshop Netw. Group Comm., pp. 71-81, Stanford, Calif., November 2000.

While the above is a detailed description of the present invention, it is only exemplary and various modifications, alterations and equivalents may be employed in various apparati and processes described herein. Accordingly, the scope of the present invention is hereby defined by the metes and bounds of the following claims:

What is claimed is:

1. A method for communicating the content of a live data stream to a receiver using a plurality of channels comprising one or more main channels having at least two sub-channels, the method comprising:

receiving a first segment of a live data stream, the first segment, $S_0$, containing first segment data;

applying a forward error correction algorithm the first segment data to produce a corresponding transmit block, $T_0$;

dividing the $T_0$ block into two or more $T_0$ sub-blocks, wherein each of the two or more $T_0$ sub-blocks comprise substantially distinct FEC-encoded first segment data;

transmitting a first of the two or more $T_0$ sub-blocks to a receiver on a first main sub-channel;

receiving a second segment of the live data stream, the second segment, $S_1$, containing second segment data;

applying a forward error correction algorithm to the second segment data to produce a transmit block $T_1$;

dividing the $T_1$ block into two or more $T_1$ sub-blocks, wherein each of the two or more $T_1$ sub-blocks comprises substantially distinct FEC-encoded second segment data;

transmitting substantially concurrently, the second of the two or more $T_0$ sub-blocks on the first main sub-channel and a first of the two or more $T_1$ sub-blocks on a second main sub-channel.

2. The method recited in claim 1, wherein applying a forward error correction algorithm to two or more subsets of the first and second segment data comprises applying a Luby Transform to the first and second segment data.

3. The method recited in claim 1, wherein applying a forward error correction algorithm to two or more subsets of the first and second segment data comprises applying a Reed-Solomon transform to the first and second segment data.

4. The method recited in claim 1, further comprising:

receiving the first $T_0$ sub-block via the first main sub-channel; and receiving the second $T_0$ sub-block via the first channel and the first $T_1$ sub-block via the second channel substantially concurrently.

5. The method recited in claim 1, wherein the plurality of channels also comprises one or more booster channels each having at least two sub-channels and the receiver has insufficient bandwidth to receive the transmitted blocks on the main and booster channels simultaneously, the method further comprising:

receiving a least one of the two or more $T_0$ sub-blocks via the booster channel;

recovering the first segment data from the at least one received $T_0$ sub-block;

thereafter, switching receiver reception to the main channel;

receiving at least one of the two or more $T_1$ sub-blocks via the second main sub-channel; and recovering the second segment data from the at least one received $T_1$ sub-block.

6. The method of claim 1, further comprising transmitting substantially concurrently, the first $T_0$ sub-block on a first booster sub-channel, and the first $T_1$ sub-block on a second booster sub-channel, wherein the second $T_0$ sub-block, the second $T_1$ sub-block, the first $T_0$ sub-block, and the first $T_1$ sub-block are all transmitted substantially concurrently.

7. The method recited in claim 1, wherein the $T_0$ and $T_1$ blocks are divided into three of more $T_0$ sub-blocks and three or more $T_1$ sub-blocks, respectively, and wherein each of the three or more $T_0$ and $T_1$ sub-blocks comprise substantially distinct data, the method further comprising:

receiving a third segment of the live data stream, the third segment, $S_2$, containing third segment data;

applying a forward error correction algorithm to the third segment data to produce a transmit block, $T_2$;

dividing the $T_2$ block into three or more $T_2$ sub-blocks, wherein each of the three or more $T_2$ sub-blocks comprises substantially distinct third segment data;

transmitting the third of the three or more $T_0$ sub-blocks on the first main sub-channel after the second $T_0$ sub-block;

transmitting a second of the three or more $T_1$ sub-blocks on the second main sub-channel after the first $T_1$ sub-block; and transmitting a first of the three or more $T_2$ sub-blocks to the receiver on a third main sub-channel, wherein the third $T_0$ sub-block, the second $T_1$ sub-block, and the first $T_2$ sub-block are all transmitted substantially concurrently.

8. The method recited in claim 7, wherein the plurality of channels also comprises one or more booster channels each having at least two sub-channels, the method further comprising:

transmitting, on a first booster sub-channel, the first of the three of more $T_2$ sub-blocks after the first $T_1$ block;

transmitting, on a second booster sub-channel, the first $T_1$ sub-block after the first $T_0$ sub-block; and transmitting, on a third booster sub-channel, the second $T_1$ sub-block after the second $T_0$ sub-block.

9. The method recited in claim 7, wherein the plurality of channels also comprises one or more booster channels each having at least two sub-channels and the receiver has insufficient bandwidth to receive the transmitted blocks on the main and booster channels simultaneously, the method further comprising:

receiving a least one of the two or more $T_0$ sub-blocks via the booster channel;

recovering the first segment data from the at least one received $T_0$ sub-block;

thereafter, switching receiver reception to the main channel;

receiving at least one of the three or more $T_1$ sub-blocks via the second main sub-channel;

recovering the second segment data from the at least one received $T_1$ sub-block;

receiving at least one of the three or more $T_2$ sub-blocks via the third main sub-channel; and recovering the third segment data from the at least one received $T_2$ sub-block.

10. A system operable to communicate the content of a live data stream to a receiver via a plurality of channels, the system comprising:

a receiver operable to receive first and second segments of a live data stream, the first and second segments containing first and second segment data, respectively;

an encoder operable to apply a forward error correction algorithm to the first segment data and to the second segment data to produce a corresponding first transmit block, $T_0$, and a second transmit block, $T_1$;

a block partitioner operable to divide each of the first and second transmit blocks $T_0$ and $T_1$ into a plurality of sub-blocks; and a transmitter operable to transmit the $T_0$ sub-blocks on a first channel and the plurality of $T_1$ sub-blocks on a second channel;

wherein the receiver is a switchable, single-channel receiver configured to switch reception between a first channel to receive one or more of the $T_0$ sub-blocks and a second channel to receive one or more of the $T_1$ sub-blocks.

11. The system recited in claim 10, wherein the encoder comprises an information additive code generator.

12. The system recited in claim 10, further comprising a decoder operable to recover the first segment data from the received one or more $T_0$ data blocks and the second segment.

13. The system recited in claim 12, wherein the decoder comprises an information additive code decoder.

* * * * *